US008639947B2

(12) United States Patent
Elovici et al.

(10) Patent No.: US 8,639,947 B2
(45) Date of Patent: Jan. 28, 2014

(54) STRUCTURE PRESERVING DATABASE ENCRYPTION METHOD AND SYSTEM

(75) Inventors: Yuval Elovici, Moshav Shetolim (IL); Ronen Waisenberg, Beer Sheva (IL); Erez Shmueli, Beer Sheva (IL)

(73) Assignee: Ben Gurion University of the Negev Research and Development Authority, Beer Sheva (IL)

( * ) Notice: Subject to any disclaimer, the term of this patent is extended or adjusted under 35 U.S.C. 154(b) by 1453 days.

(21) Appl. No.: 11/628,284

(22) PCT Filed: May 30, 2005

(86) PCT No.: PCT/IL2005/000556
§ 371 (c)(1),
(2), (4) Date: Jun. 21, 2007

(87) PCT Pub. No.: WO2005/119960
PCT Pub. Date: Dec. 15, 2005

(65) Prior Publication Data
US 2008/0133935 A1    Jun. 5, 2008

Related U.S. Application Data

(60) Provisional application No. 60/575,379, filed on Jun. 1, 2004.

(51) Int. Cl.
*G06F 21/00* (2013.01)
(52) U.S. Cl.
USPC .............. 713/193; 380/37; 380/44; 380/46; 726/2; 726/3; 726/4; 726/12; 705/51; 705/52; 705/54; 705/80
(58) Field of Classification Search
USPC ....................................... 713/193
See application file for complete search history.

(56) References Cited

U.S. PATENT DOCUMENTS

| 4,375,579 | A |   | 3/1983  | Davida et al. |
|-----------|---|---|---------|---------------|
| 4,605,820 | A | * | 8/1986  | Campbell, Jr. .................. 705/71 |
| 4,977,594 | A | * | 12/1990 | Shear ............................. 705/53 |
| 5,297,207 | A | * | 3/1994  | Degele .......................... 380/46 |
| 5,410,598 | A | * | 4/1995  | Shear ............................. 705/53 |

(Continued)

OTHER PUBLICATIONS

Ethical Hacking and Password Cracking|http://delivery.acm.org/10.1145/1240000/1231051/p13-snyder.pdf?ip=151.207.250.51&id=1231051&acc=ACTIVE%20SERVICE&key=986B26D8D17D60C8AAC6AC1B60173C4E&CFID=378178285&CFTOKEN=54485367&_acm_=1384212891_dc9ff683f00f9ef7eb9c57c356e6fa15|Robin Snyder|2006|Pages 13-18.*

(Continued)

*Primary Examiner* — Mahfuzur Rahman
(74) *Attorney, Agent, or Firm* — Roach Brown McCarthy & Gruber, P.C.; Kevin D. McCarthy

(57) ABSTRACT

A database encryption system and method, the Structure Preserving Database Encryption (SPDE), is presented. In the SPDE method, each database cell is encrypted with its unique position. The SPDE method permits to convert a conventional database index into a secure one, so that the time complexity of all queries is maintained. No one with access to the encrypted database can learn anything about its content without the encryption key. Also a secure index for an encrypted database is provided. Furthermore, secure database indexing system and method are described, providing protection against information leakage and unauthorized modifications by using encryption, dummy values and pooling, and supporting discretionary access control in a multi-user environment.

13 Claims, 8 Drawing Sheets

(56) References Cited

U.S. PATENT DOCUMENTS

| | | | | |
|---|---|---|---|---|
| 5,835,600 | A * | 11/1998 | Rivest | 380/44 |
| 6,307,938 | B1 * | 10/2001 | Matyas et al. | 380/44 |
| 6,339,825 | B2 * | 1/2002 | Pensak et al. | 713/158 |
| 6,385,316 | B1 * | 5/2002 | Rose | 380/28 |
| 6,789,195 | B1 * | 9/2004 | Prihoda et al. | 713/182 |
| 6,981,200 | B2 * | 12/2005 | Maung et al. | 714/781 |
| 7,093,137 | B1 * | 8/2006 | Sato et al. | 713/193 |
| 7,124,302 | B2 * | 10/2006 | Ginter et al. | 713/189 |
| 7,177,424 | B1 * | 2/2007 | Furuya et al. | 380/37 |
| 7,506,165 | B2 * | 3/2009 | Kocher et al. | 713/194 |
| 7,668,310 | B2 * | 2/2010 | Kocher et al. | 380/37 |
| 2002/0016922 | A1 * | 2/2002 | Richards et al. | 713/200 |
| 2002/0104002 | A1 | 8/2002 | Nishizawa et al. | |
| 2003/0065940 | A1 | 4/2003 | Brezak et al. | |
| 2005/0166046 | A1 | 7/2005 | Bellovin et al. | |
| 2012/0063593 | A1 * | 3/2012 | Camenisch et al. | 380/44 |

OTHER PUBLICATIONS

Davida G. I., Wells, D. L. and Kam J. B., "A Database Encryption System with Subkeys", ACM Trans Database Sys., vol. 6, No. 2; Jun. 1981; p. 312-28.

Min-Shlang, H., and Wei-Pang, Y., "Multilevel Secure Database Encryption with Subkeys"; Data & Knowledge Eng. 22 (1997) 117-131.

Chang, C.C., and Chan, C.W., "A Database Record Encryption Scheme Using RSA Public Key Cryptosystem and its Master Keys"; ICCNMC proceedings—2003.

Ramakrishnan, R. and Gehrke, J., "Database Management Systems" 2nd Ed., p. 327 (2000).

Haelgumus, H., Iyer, B., Li, C., and Mehrotra, S., "Executing SQL Over Encrypted Data in the Database-Service-Provider Model", ACM SIGMOID (2002).

Iyer, B., Mehrotra, S., Mykietun, E., Tsudic, G., and Wu, Y., "A Framework for Efficient Storage Security in RDBMS", EDET (2004), p. 147-64.

Bouganim, L., and Pucheral, P., "Chip-secured data access: Confidential Data on Untrusted Servers"; 28th VLOB Conference proceedings (2002).

Agrawal, R., Kiernan, J., Srikant, R., and Xu, Y., "Order Preserving Encryption for Numeric Data", SIGMOID 2003.

Damiani, E., De Captiani Divimercati, S., Jajodia, S., Paraboschi, S., and Samarati, P., "Balancing Confidentiality and Efficiency in Untrusted Relational DBMSs"; CCS 2003.

Bertino, E., and Ferrari, E., "Secure and Selective Dissemination of XML Documents"; ACM Trans Info&Sys, vol. 5, No. 3, Aug. 2002, p. 290-331.

* cited by examiner

A table before Encryption

| Row | C |
|---|---|
| 0 | 16 |
| 1 | 85 |
| 2 | 37 |
| 3 | 16 |
| 4 | 16 |
| 5 | 92 |
| 6 | 37 |
| 7 | 50 |
| 8 | 24 |
| 9 | 86 |

Encryption of the Table Using the SPDE system and method

| Row | CCC |
|---|---|
| 0 | !# |
| 1 | :] |
| 2 | &* |
| 3 | "/ |
| 4 | ~? |
| 5 | \|^ |
| 6 | >\ |
| 7 | @= |
| 8 | )} |
| 9 | -+ |

Fig. 4

STRUCTURE PRESERVING DATABASE ENCRYPTION METHOD AND SYSTEM

FIELD OF THE INVENTION

The present invention relates to database encryption and more particularly, the invention relates to structure preserving database encryption method and system, wherein no one with access to the encrypted database can learn anything about its content without the encryption key.

DEFINITIONS, ACRONYMS AND ABBREVIATIONS

Throughout this specification, the following definitions are employed:

AES: Short for Advanced Encryption Standard, a symmetric 128-bit block data encryption technique. AES is a block cipher adopted as an encryption standard and is expected to be used worldwide and analysed extensively, as was the case with its predecessor, the Data Encryption Standard (DES). AES has a fixed block size of 128 bits and a key size of 128, 192 or 256 bits with key and block sizes in any multiple of 32 bits, with a minimum of 128 bits and a maximum of 256 bits.

B-Tree: are tree data structures that are most commonly found in databases and filesystems. B-trees keep data sorted and allow amortized logarithmic time insertions and deletions. B-trees generally grow from the bottom up as elements are inserted, whereas most binary trees grow down. B-trees have substantial advantages over alternative implementations when node access times far exceed access times within nodes. This usually occurs when most nodes are in secondary storage such as hard drives.

B+-Tree: is a type of tree data structure. It represents sorted data in a way that allows for efficient insertion and removal of elements. It is a dynamic, multilevel index with maximum and minimum bounds on the number of keys in each node. A B+-Tree is a variation on a B-Tree. In a B+-Tree, in contrast to a B-Tree, all data are saved in the leaves. Internal nodes contain only keys and tree pointers. All leaves are at the same lowest level. Leaf nodes are also linked together as a linked list to make range queries easy. The maximum number of keys in a record is called the order of the B+-Tree. The minimum number of keys per record is ½ of the maximum number of keys. For example, if the order of a B+-Tree is n, each node (except for the root) must have between n/2 and n keys. The number of keys that may be indexed using a B+-Tree is a function of the order of the tree and its height.

Cipher: A cipher (also spelt cypher) is an algorithm for performing encryption (and the reverse, decryption)—a series of well-defined steps that can be followed as a procedure. An alternative term is encipherment. The original information is known as plaintext, and the encrypted form as ciphertext.

Ciphertext: The ciphertext message contains all the information of the plaintext message, but is not in a format readable by a human or computer without the proper mechanism to decrypt it; it should resemble random gibberish to those not intended to read it.

DAC: Short for Discretionary Access Control. DAC defines basic access control policies to objects in a filesystem. Generally, these are done at the discretion of the object owner—file/directory permissions and user/group ownership. DAC is a means of restricting access to objects based on the identity and need-to-know of users and/or groups to which the object belongs. Controls are discretionary in the sense that a subject with a certain access permission is capable of passing that permission (directly or indirectly) to any other subject.

DBMS: A Database Management System (DBMS) is a system, usually automated and computerized, for the management of any collection of compatible, and ideally normalized, data. A database management system (DBMS) is actually a computer program (or more typically, a suite of them) designed to manage a database, a large set of structured data, and run operations on the data requested by numerous users. Typical examples of DBMS use include accounting, human resources and customer support systems. Originally found only in large companies with the computer hardware needed to support large data sets, DBMSs have more recently emerged as a fairly standard part of any company back office. DBMS's are found at the heart of most database applications.

DBA: Database Administrator (DBA) is a person who is responsible for the environmental aspects of a database. The duties of a database administrator at a particular site vary, depending on the policies in place and the database management system's (DBMS's) capabilities for carrying them out. They nearly always include disaster recovery (backups and testing of backups), performance analysis, and some database design or assistance thereof.

DES: The Data Encryption Standard (DES) is the archetypal block cipher (a method for encrypting information)—an algorithm that takes a fixed-length string of plaintext bits and transforms it through a series of complicated operations into another ciphertext bitstring of the same length. In the case of DES, the block size is 64 bits. DES also uses a key to customise the transformation, so that decryption can only be performed by those who know the particular key used to encrypt. The key ostensibly consists of 64 bits; however, only 56 of these are actually used by the algorithm. Eight bits are used solely for checking parity, and are thereafter discarded. Hence the effective key length is 56 bits, and it is usually quoted as such.

DML: Short for Data Manipulation Language. DML is a family of computer languages used by computer programs or database users to retrieve, insert, delete and update data in a database. The currently most popular Data manipulation language is that of SQL, which is used to retrieve and manipulate data. Data manipulation languages were initially only used by computer programs, but (with the advent of SQL) have come to be used by people, as well. Data manipulation languages have their functional capability organized by the initial word in a statement, which is almost always a verb. In the case of SQL, these verbs are "select", "insert", "update", and "delete". This makes the nature of the language into a set of imperative statements (commands) to the database. Data manipulation languages tend to have many different "flavors" and capabilities between database vendors.

Hash Function: is a function that converts an input from a (typically) large domain into an output in a (typically) smaller range (the hash value, often a subset of the integers). Hash functions vary in the domain of their inputs and the range of their outputs and in how patterns and similarities of input data affect output data. Hash functions are used in hash tables, cryptography, data processing, etc.

Kerberos: is a computer network authentication protocol, which allows individuals communicating over an insecure network to prove their identity to one another in a secure manner.

MD5: Short for Message-Digest algorithm 5 is a widely-used cryptographic hash function with a 128-bit hash value. As an Internet standard, MD5 has been employed in a wide variety of security applications, and is also commonly used to check the integrity of files. MD5 digests are widely used in the software world to provide some assurance that a downloaded file has not been altered. A user can compare a publicized MD5 sum with the checksum of a downloaded file. On the assumption that publicized checksum can be trusted to be authentic, a user can have considerable confidence that the file is the same as that released by the developers, protecting against Trojan horses and computer viruses being added to the software surreptitiously.

Plaintext: Plaintext is information used as input to an encryption algorithm; the output is termed ciphertext. The plaintext could be, for example, a diplomatic message, a bank transaction, an email, a diary and so forth—any information that someone might want to prevent others from reading. Plaintext is typically human readable, either directly or with some commonly available device, such as a Compact Disk player. In some systems, however, multiple layers of encryption are used, in which case the ciphertext output of one encryption algorithm becomes the plaintext input to the next.

Polyalphabetic Cipher: is any cipher based on substitution, using multiple substitution alphabets. For example, in a Caesar cipher (one of the various Polyalphabetic ciphers) each letter of the alphabet is shifted along some number of places; for example, in a Caesar cipher of shift 3, A would become D, B would become E and so on.

Pseudo-column: Pseudo-columns are not actual columns in a table, but values can be selected from them. Row-ID (identification)—the binary address of a row in a database—is an example to a Pseudo-column.

Session: In computer science a session is either a lasting connection using the session layer of a network protocol or a lasting connection between a user (or user agent) and a peer, typically a server, usually involving the exchange of many packets between the user's computer and the server. A session is typically implemented as a layer in a network protocol (e.g. telnet, FTP).

SSL: Short for Secure Sockets Layer. SSL provides endpoint authentication and communications privacy over the Internet using cryptography. In typical use, only the server is authenticated (i.e. its identity is ensured) while the client remains unauthenticated. The protocols allow client/server applications to communicate in a way designed to prevent various attacks.

TSL: Short for Transport Layer Security, a protocol that guarantees privacy and data integrity between client/server applications communicating over the Internet. The TLS protocol is made up of two layers: (1) The TLS Record Protocol—layered on top of a reliable transport protocol, such as TCP, it ensures that the connection is private by using symmetric data encryption and it ensures that the connection is reliable. The TLS Record Protocol also is used for encapsulation of higher-level protocols, such as the TLS Handshake Protocol. (2) The TLS Handshake Protocol—allows authentication between the server and client and the negotiation of an encryption algorithm and cryptographic keys before the application protocol transmits or receives any data. TLS is application protocol-independent. Higher-level protocols can layer on top of the TLS protocol transparently. TLS supersedes and is an extension of SSL.

Vernam cipher: Vernam cipher (also known as "The one time pad") uses a keyword as a key and is secure, as long as the keyword is never used again. It is a symmetric polyalphabetic cipher. One picks a keyword and then adds on each letter to a corresponding letter of the plaintext. The decryption is done using the same key, but subtracting the key letter value from the corresponding letter of the ciphertext. The plaintext can not be longer than the key. A key which is used more than once reduces the one time pad to a Vigenere cipher, which is much easier to break.

Web browser: Web Browser is a software package that enables a user to display and interact with documents hosted by web servers.

XOR: Exclusive disjunction (usual symbol XOR or $\oplus$) is a logical operator that results in true if one of the operands, but not both of them, is true.

BACKGROUND OF THE INVENTION

Database is an integral part of almost every information system. The key features databases propose are shared access, minimal redundancy, data consistency, data integrity and controlled access. The case where databases hold critical and sensitive information is quite common, therefore an adequate level of protection to database content has to be provided.

Database security methods can be divided into four layers:
physical security;
operating system security;
DBMS (Database Management System) security; and
data encryption.

The first three layers alone are not sufficient to guarantee the security of the database since the database data is kept in a readable form. Anyone having access to the database including the DBA (Database Administrator) is able to read the data. In addition, the data is frequently backed up so access to the backed up data also needs to be controlled. Moreover, a distributed database system makes it harder to control disclosure of the data.

The secure transmission of data and user authentication has been well studied and incorporated into today's e-business market. Almost all Web browsers and servers support SSL (Secure Socket Layer) or TSL (Transport Socket Layer) so, for example, a credit card number is protected on its way to the Web server. Vendors, such as VeriSign® supply services of third party authentication. Before creating a secured channel, for example SSL channel, Web browsers authenticate the destination address by verifying the authenticity of the Web server's certificate. However, once the data arrives securely at the certified server support in storing and processing the data in a secure way is inadequate.

Security and privacy aspects of private data stored on a data storage server have recently become an interesting and challenging field of research. Encryption is a well established technology for protecting sensitive data. Anyone having access to the encrypted data cannot learn anything about the sensitive data without the encryption key. Furthermore, encryption can be used to maintain data integrity so that any unauthorized changes of the data can easily be detected.

There are three general approaches for considering integrating cryptography into databases:

The first approach is called "loose coupling". In this approach, the server implements pre-defined cryptographic services installed on the database server. One example is an encryption package that is stored on the database server and encrypts the newly inserted database content using the user supplied encryption key.

The second approach is called "tight coupling". In this approach a new set of cryptographic services are added to the DB as new SQL statements together with the necessary control and execution context ensures that the new SQL queries are executed securely. This approach is a harder task to implement than the previous one, since changes have to be performed in core database software.

The third approach is a mixture of both approaches where some changes are implemented as new SQL statements while most of the changes are integrated into the database as stored procedures built over the new set of SQL statements.

The three approaches described above consider encryption to be performed in the database server. Thus, the database server is assumed to be trusted.

Database Encryption Methods

Database encryption can be implemented at different levels: tables, columns, rows and cells. Encrypting the whole table, column or row entails the decryption of the whole table, column or row respectively when a query is executed. Therefore, an implementation which decrypts only the data of interest is preferred.

Several database encryption methods have been proposed. For example, a database encryption method presented in U.S. Pat. No. 4,375,579 (on the basis of this patent was publicized an article "A Database Encryption System with Subkeys" by Davida G. I., Wells, D. L. and Kam J. B.) is based on the Chinese-Reminder theorem where each row is encrypted using different sub-keys for different cells. This method enables encryption at the level of rows and decryption at the level of cells. However, U.S. Pat. No. 4,375,579 has a number of significant disadvantages:

a. It relays on a specific encryption function and not on any symmetric or asymmetric encryption function.

b. Each encrypted record is a single function of all of its field values and each field is encrypted with a separate encryption key. In order to perform an update operation, all field values must be known. This means that only by having all the encryption keys any change can be made to a record. Updates can be performed only at secure periods when all of the encryption keys are accessible to the DBMS.

c. In order to perform management operations, such as adding or deleting a column, all of the encryption keys for that column have to be accessed and the values have to be decrypted (Deleting of adding a column has immediate affect on all of the fields in all of the records in the table).

d. Needs a special mechanism for updates that could only be performed during secure periods. After each update, each row can not be accessed until it is re-encrypted, since the selected values are not the updated values. In order to select specific fields, the entire record has to be retrieved in order to decrypt the above specific fields.

Another database encryption method presented in "Multilevel Secure Database Encryption with Subkeys" by Min-Shiang, H., and Wei-Pang, Y. extends the encryption method presented in U.S. Pat. No. 4,375,579 by supporting multilayer access control. It classifies subjects and objects into distinct security classes which are ordered in a hierarchy such that an object with a particular security class can be accessed only by subjects in the same or a higher security class. In this method, each row is encrypted with sub-keys according to the security class of its cells. Still another database encryption method presented in "A Cryptographic Mechanism for Sharing Databases" by Buehrer, D., and Chang, C. proposes an encryption method for a database based on Newton's interpolating polynomials. One disadvantage of all the above methods is that the basic element in the database is a row and not a cell, thus the structure of the database is modified. In addition, all of those methods require re-encrypting the entire row when a cell value is modified.

A further database encryption method presented in "A Database Record Encryption Scheme Using RSA Public Key Cryptosystem and Its Master Keys" by Chang, C. C., and Chan, C. W. is based on the RSA public-key method and suggests two database encryption methods: one field oriented and the other record oriented. Both of the suggested methods support distinction between write and read access rights. The disadvantage of the field oriented encryption method is that it is not resistant to substitution attacks trying to substitute two encrypted cells. The disadvantage of the record oriented method is similar to the one of the record oriented encryption methods discussed above. Still further encryption method provided in "Practical Techniques for Searches on Encrypted Data" by Song, D. X., Wagner, D., and Perrig, A. suggests computing the bitwise exclusive or (XOR) of the plaintext values with a sequence of pseudo-random bits generated by the client according to the values of the plaintext value and a secure encryption key. This method supports searches over the encrypted data without revealing anything about the plaintext values except the locations of the searched plaintext. However, the proposed method does not protect from attacks that substitute two encrypted values in the database and requires query translation since the pseudo-random bits for a value searched need to be computed by the client.

Still a further encryption method presented in "GBDE-GEOM Based Disk Encryption Source" by Kamp, P. H. suggests encrypting the entire physical disk allowing the database to be protected. One of the disadvantages of that method is that the DBA can perform no administrative tasks on the database, since the entire content of the database is encrypted.

Therefore, it is an object of the present invention, to provide a simple and efficient method and system for database encryption, overcoming the shortcomings of the prior art database encryption methods.

It is another object of the present invention, to suggest how to encrypt the entire content of the database without changing its structure.

It is still another object of the present invention, to allow the DBA to continue managing the database without being able to view or manipulate the database content.

It is still another object of the present invention, to provide a method and system for database encryption, wherein anyone gaining access to the database can not learn anything about its content or tamper the data, unnoticed, without the encryption key.

It is a further object of the present invention to provide a method and system decrypting only the data of interest.

It is still a further object of the present invention to provide a method and system for database encryption, wherein the structure of the database tables and indexes remains as before encryption.

It is still a further object of the present invention to provide a method and system for database encryption, wherein queries are not changed because of the encryption.

It is still a further object of the present invention to provide a method and system for database encryption, ensuring that existing applications can use the encrypted database without the need for any changes in the application software.

It is still a further object of the present invention to provide a method and system for secure database indexing, protecting against information leakage and unauthorized modifications.

It is still a further object of the present invention to provide a method and system for secure database indexing supporting discretionary access control in a multi-user environment.

Other objects and advantages of the invention will become apparent as the description proceeds.

Indexing Encrypted Databases

The conventional way to provide an efficient execution of database queries is using indexes. Indexes in an encrypted database raise the question of how to construct the index so that no information about the database content is revealed.

Increasingly, organizations and users prefer to outsource their data center operations to external application providers. As a consequence of this trend toward outsourcing, highly sensitive data is now stored on systems that are not under the data owner control. While data owners may not entirely trust providers' discretion, preventing a provider from inspecting data stored on their own machines is difficult. For this kind of service to work successfully it is of primary importance to provide means of protecting the secrecy of the information remotely stored, while guaranteeing its availability to legitimate clients.

Communication between the client and the database service provider can be secured through standard means of encryption protocols such as SSL (Secure Socket Layer). With regard to the stored data security, access control has proved to be useful, provided that data is accessed using the intended system interfaces. However, access control is useless if the attacker simply gains access to the raw database data, thus bypassing the traditional mechanisms. This kind of access can easily be gained by insiders, such as the system administrator and the database administrator (DBA).

Database encryption introduces an additional layer to conventional network and application security solutions, and prevents exposure of sensitive information even if the raw data is compromised. Database encryption prevents unauthorized users from viewing sensitive data in the database and, it allows database administrators to perform their tasks without having access to sensitive information. Furthermore, it protects data integrity as unauthorized modifications can easily be detected.

A common technique to speed up queries execution in databases is to use a pre-computed index, as described in "Database Management Systems" by Ramakrishnan, R. and Gehrke, J. However, once the data is encrypted, the use of standard indexes is not trivial and it depends on the encryption function used. Most encryption functions preserve equality thus, Hash indexes can be used, but information, such as the frequencies of indexed values is revealed. Most encryption functions do not preserve order thus, B-Tree indexes, can no longer be used once the data is encrypted.

Furthermore, if several users with different access rights use the same index, each one of them needs access to the entire index, possibly to indexed elements, which are beyond his access rights. Google™ Desktop, as an example to this problem, allows indexing and searching personal computers data. Using this tool, a legitimate user, is able to bypass user names and passwords, and view personal data of other users who use the same computer, since it is stored in the same index.

Indexes are mostly structured as trees and which can reveal the order of the indexed nodes (by browsing the ordered leafs). This information can be exploited to estimate the value of a particular encrypted node since the relative position of the encrypted node within the ordered set of nodes can imply the plaintext value of this node. In addition, the references to the positions of a particular indexed value may allow various statistical attacks on the indexed values. Even if the references to the indexed values are secured, a change to the index after an insert to the database provides the potential attacker with valuable information (an attacker could correlate the new value inserted to the index with the new value inserted to the database and thus reveal the reference for that value).

Several methods for encrypted indexing have been proposed in the past. For example, an indexing method provided in "Executing SQL Over Encrypted Data in the Database-Service-Provider Model" by Hacigumus, H., Iyer, B., Li, C., and Mehrotra, S. is based on encrypting the whole database row and assigning a set identifier to each value in this row. When searching a specific value, its set identifier is calculated and then passed to the server who in turn returns to the client a collection of all rows with values assigned to the same set. Finally, the client searches the specific value in the returned collection and retrieves the desired rows. In this method, equal values are always assigned to the same set, thus some information is revealed when applying statistical attacks. Using this approach requires more computation by the client since the result of the queries is not accurate. Furthermore, the sizes of the buckets assigned to the same set are also a matter to be considered.

Another indexing method provided in "A Framework for Efficient Storage Security in RDBMS" by Iyer, B., Mehrotra, S., Mykletun, E., Tsudic, G., and Wu, Y. is based on constructing the index on the plaintext values and encrypting each page separately. Whenever a specific page of the index is needed for processing a query, it is loaded into memory and decrypted.

Since the uniform encryption of all pages is likely to provide many cipher breaking clues, still another indexing method provided in "Chip-secured data access: Confidential Data on Untrusted Servers" by Bouganim, L., and Pucheral, P. suggests encrypting each index page using a different key depending on the page number.

However, the above methods described in "A Framework for Efficient Storage Security in RDBMS" by Iyer, B., Mehrotra, S., Mykletun, E., Tsudic, G., and Wu, Y., and "Chip-secured data access: Confidential Data on Untrusted Servers" by Bouganim, L., and Pucheral, P. implemented at the level of the operating system are not satisfactory since in most cases it is not possible to modify the operating system implementation. Furthermore, in these methods, it is not possible to encrypt different portions of the database using different keys.

A further indexing method suggested by Boneh, D., Crescenzo, G. D., Ostrovsky, R., and Persiano, G. in "Public Key Encryption with Keyword Search" constructs a mechanism enabling the server searching for pre-defined key words within a document using a special "trapdoor" supplied by the user for that keyword. Apart from the key word, the method reveals nothing about the document. However, the above method does not support range queries and query translation has to be performed since the client has to compute the "trapdoor" from each keyword searched.

The major drawback of the last two methods is that there is no support in indexes structured as trees since the server can only perform exact matches to the user's query and thus lacks the ability to evaluate the relation between two tree nodes in the index.

Assuming the index is implemented as a B+-Tree, encrypting each of its fields separately would reveal the ordering relationship between the encrypted values.

Still a further indexing method suggested in "Order Preserving Encryption for Numeric Data" by Agrawal, R., Kiernan, J., Srikant, R., and Xu, Y. builds the index over the data encrypted using an encryption method called OPES (Order Preserving Encryption Scheme). OPES allows comparison operations to be applied directly to the encrypted data. However, revealing the order of the encrypted values is not acceptable for any application.

Still a further indexing method provided in "Balancing Confidentiality and Efficiency in Untrusted Relational DBMSs" by Damiani, E., De Captiani Divimercati, S., Jajodia, S., Paraboschi, S., and Samarati, P. suggests encrypting each node of the B+-Tree as a whole. However, since references between the B+-Tree nodes are encrypted together with the index values, the index structure is concealed, and therefore the DBA finds the index unmanageable.

The Attacker Model

The attacker can be categorized into three classes: Intruder—a person who gains access to a computer system and tries to extract valuable information. Insider—a person who belongs to the group of trusted users and tries to get information beyond his own access rights. Administrator—a person who has privileges to administer a computer system, but uses his administration rights in order to extract valuable information. All of the above attackers can use different attack strategies: Direct storage attacks—attacks against storage may be performed by accessing database files following a path other than through the database software, by physical removal of the storage media or by access to the database backup disks. Indirect Storage attacks—an adversary can access schema information, such as table and column names, metadata, such as column statistics, and values written to recovery logs in order to guess data distributions. Memory attacks—an adversary can access the memory of the database software directly (The last one is usually protected by the Hardware/Operation System level).

When selecting the right approach for indexing encrypted databases, the following aspects should be considered:

a. Information Leakage—a secure index in an encrypted database should not reveal any information on the database plaintext values. The possible information leaks are: Static leakage—Gaining information on the database plaintext values by observing a snapshot of the database at a certain time. For example, if the index is encrypted in a way that equal plaintext values are encrypted to equal ciphertext values, statistics about the plaintext values, such as their frequencies can easily be learned. Linkage leakage—Gaining information on the database plaintext values by linking a database value to its position in the index. For example, if the database value and the index value are encrypted in the same way (both ciphertext values are equal), an observer can search the database ciphertext value in the index, determine its position and estimate its plaintext value. Dynamic leakage—Gaining information about the database plaintext values by observing and analyzing the changes performed in the database over a period of time. For example, if a user monitors the index for a period of time, and if in this period of time only one value is inserted (no values are updated or deleted), the observer can estimate its plaintext value based on its position in the index.

b. Unauthorized Modification—In addition to the passive attacks that monitor the index, active attacks that modify the index should also be considered. Active attacks are more problematic, in the sense that they may mislead the user. For example, modifying index references to the database rows may result in queries returning erroneous set of rows, possibly benefiting the adversary. Unauthorized modifications can be made in several ways: Spoofing—Replacing a ciphertext value with a generated value; Splicing—Replacing a ciphertext value with a different ciphertext value; Replay—Replacing a ciphertext value with an old version previously updated or deleted.

c. Structure Perseverance—When applying encryption to an existing database, it would be desirable that the structure of the database tables and indexes is not modified during the encryption. This ensures that the database tables and indexes can be managed in their encrypted form by a database administrator as usual, while keeping the database contents hidden. For example, if a hash index is used and the values therein do not distribute equally, performance might be undermined, and the DBA might wish to replace the hash function. In such a case, the DBA needs to know structure information, such as the number of values in each list, but does not need to know the values themselves.

d. Performance—Indexes are used in order to speed up queries execution. However, in most cases, using encrypted indexes causes performance degradation due to the overhead of decryption. Indexes in an encrypted database raise the question of how to construct the index so that no information about the database content is revealed, while performance in terms of time and storage is not significantly affected.

Discretionary Access Control (DAC)

In a multi-user (discretionary) database environment each user only needs access to the database objects (e.g., group of cells, rows and columns) needed to perform his job. Encrypting the whole database using the same key, even if access control mechanisms are used, is not enough. For example, an insider who has the encryption key and bypasses the access control mechanism can access data that are beyond his security group. Encrypting objects from different security groups using different keys ensures that a user who owns a specific key can decrypt only those objects within his security group. Following this approach, different portions of the same database column might be encrypted using different keys. However, a fundamental problem arises when an index is used for that column. In this case each one of the users, who belong to different security groups using different keys, needs access to the entire index, possibly to indexed elements, which are beyond their access rights. The same problem arises when the index is updated.

Key Management in Database Encryption Methods

Databases contain information of different levels of sensitivity that have to be selectively shared between large numbers of users. Encrypting each column with a different key, results in a large number of keys for each legitimate user. However, using the approach proposed in "Secure and Selective Dissemination of XML Documents" by Bertino, E., and Ferrari, E. can reduce the number of keys. It is shown how the smallest elements which can be encrypted using the same key according to the access control policy can be found. Thus, the keys are generated according to the access control policy in order to keep their number minimal. This approach can be incorporated in the proposed method to encrypt sets of columns with the same key in accordance with the database access control policy. The dynamic nature of encrypted databases adds complexity and special requirements to the key management process. However, "Secure and Selective Dissemination of XML Documents" by Bertino, E., and Ferrari, E. does not deals the database encryption problems.

Key management in encrypted databases can be preformed at five different levels:

a. keys can be created on a database level; this implies that the whole database is encrypted using the same key, thus, users gaining access to the encryption key can access the whole database;

b. keys can be created on a table level; each table will be encrypted using (possibly) a different key, and a user that gaining access to one of the encryption keys can access all tables encrypted using that key;

c. keys can be created in vertical-partitions-levels; in this case, each row can be encrypted using a different key;

d. keys can be created on a column level; this enables each column to be encrypted using a different key; and e. keys can be created on a cell level; this enables maximal freedom when enforcing the access control policy by encryption but introduces difficulties when managing key updates, data manipulations and changes to the access control policy.

There are three different approaches to the encryption keys storage:

a. Storing the encryption keys at the server side—The server has full access to the encryption keys. All computation is performed at the server side.

b. Storing encryption keys at the client side—The client never transfers the keys to the server and is responsible for performing all encryption and decryption operations. Where the database server has no access to the encryption keys, no computations can be performed at the server side since they entail revealing the database values.

c. Keys per session—The database server has full access to the encryption keys during the session but does not store them on disk. This ensures that the user transaction can be performed entirely at the server side, during the session. However, since the keys are never kept in the database server after a session terminates, an attacker can not learn anything about the database values as he has no access to the encryption keys.

If the database server (e.g., database service provider) is not trusted, it is preferred that the database server would not be able to learn anything about the stored data, and thus the keys are kept only at the client side. In cases when the database server is fully trusted, except for its physical storage (e.g., external storage provider, backup tapes stored in an untrusted location), the keys can be stored at the server side in some protected region.

The Desired Properties of a Database Encryption Method

According to "A Database Encryption System with Subkeys" by Davida, G. I., Wells, D. L., and Kam, J. B. a database encryption method should meet the following requirements:

security—it is mandatory that the encryption method should be either theoretically or computationally secure (require a high work factor to break it) as it is the only guarantee for data security especially in cases where the database is stored in an untrusted site;

performance—encryption and decryption should be fast enough so as not to degrade system performance (not affect the complexity of the database operations);

data volume—the encrypted data should not have a significantly greater volume than the unencrypted data; the space complexity of the database storage before and after applying the encryption method should remain the same;

decryption granularity—in order to support efficient random access, the encryption method should support the decryption of single database records without the need to access other records; moreover, database records should be independent of other records since the DBMS may rearrange records in any given time (e.g., sort table files for matters of performance, solve fragmentation problems);

encrypting different columns under different keys—this should be supported; different users have different access rights and the encryption method should support the enforcement of access rights using encryption;

patterns matching and substitution attacks—the encryption method should protect against attacks that use patterns matching and substitution of encrypted values; any unauthorized substitution should be detected at decryption time;

unauthorized access detection—modified data by an unauthorized user should be noticed at decryption time; and maintain database structure—the security mechanism should be flexible and not entail any change in the structure of the database. The structure of the database refers to two main aspects: (a) the internal database files and algorithms representing the implementation of the DBMS, (b) the SQL queries together with all the interface commands used in order to manipulate and retrieve data. Preferably applying the new encryption method should not entail any changes to the internal representation or implementation of the database or change the way the user interacts with the DBMS.

A naive approach for database encryption is to encrypt each cell separately. This approach has several drawbacks.

First, two equal plaintext values are encrypted to equal ciphertext values. Therefore, it is possible, for example, to collect statistical information as to how many different values a specified column currently has. The same holds for the ability to execute a join operation between two tables and collect information from the results.

Second, it is possible to switch unnoticed between two ciphertext values. Different ciphertext values for equal plaintext values can be achieved using a polyalphabetic cipher, for example Vernam cipher. However, in this solution decryption of a record depends on other records and thus requirement of decryption granularity described above is violated.

Encryption Granularity

Table/Index encryption can be performed at various levels of granularity: single values, records/nodes, pages or whole table/index. When choosing the level of granularity, the following should be considered:

a. Information Leakage—The higher the level of encryption granularity, the less information is revealed. Single values level encryption of the table/index reveals sensitive information, such as frequencies of the table/index values. Whole Index level encryption ensures that information about the data can not be leaked, since it is encrypted as one unit.

b. Unauthorized Modifications—Encryption at higher levels of granularity makes it harder for the attacker to tamper with the data. Single values level encryption of the table/index allows an attacker to switch two ciphertext values without being noticed. whole table/index level encryption implies that a minor modification to the encrypted table/index has a major effect on the plaintext table/index and can easily be detected.

c. Structure Perseverance—Higher levels of encryption granularity conceal the table/index structure. Whole table/index level encryption changes the structure of the index, since the basic element of reference is changed from a single value to the entire table/index. Single values level encryption of the table/index preserves its structure.

d. Performance—Finer encryption granularity affords more flexibility in allowing the server to choose what data to encrypt or decrypt. Whole table/index level encryption requires the whole table/index to be decrypted, even if a small number of table/index nodes are involved in the query. Single values level encryption of the table/index enables decryption of values of interest only.

Better performance and preserving the structure of the database can not be achieved using pages or whole table/ index encryption granularity. However, special techniques can be used in order to cope with unauthorized modifications and information leakage, when single values or records/nodes granularity encryption are used.

Hereinafter, it is assumed that the encryption keys are kept per session and that the table and index are encrypted at the single values level of granularity.

SUMMARY OF THE INVENTION

The present invention relates to Structure Preserving Database Encryption (SPDE) method and system, wherein no one with access to the encrypted database can learn anything about its content without the encryption key. Also a secure index for an encrypted database is provided. Furthermore, secure database indexing system and method are described, providing protection against information leakage and unauthorized modifications by using encryption, dummy values and pooling, and supporting discretionary access control in a multi-user environment.

The Structure Preserving Database Encryption system for a database encryption, comprises: (a.) a client for: (a.1.) receiving one or more encryption keys, according to the client's access right definition; (a.2.) generating a session; (a.3.) transferring to said database server said one or more encryption keys; and (a.4.) generating at least one query; and (b.) an authentication server for identifying said client and transferring to him said one or more encryption keys; and (c.) a database server for: (c.1.) communicating with said client by means of said session generated by said client; (c.2.) searching an encrypted database for the corresponding data requested in said at least one query; (c.3.) after finding said corresponding data, decrypting said corresponding data by means of said one or more encryption keys; and (c.4.) transferring the results of said at least one query to said client.

The Structure Preserving Database Encryption method for a database encryption, comprises: (a.) identifying a client by means of an authentication server communicating over a conventional identification protocol; (b.) receiving one or more encryption keys from said authentication server by the client, said one or more encryption keys being relevant for performing at least one query of said client, according to the client's access right definition; (c.) generating a session by means of said client with a database server; (d.) transferring from said client to said database server the corresponding one or more encryption keys received from said an authentication server; (e.) generating said at least one query by the client; (f.) searching by means of said database server an encrypted database for the corresponding data requested in said at least one query; (g.) after finding said corresponding data, decrypting said corresponding data by means of said one or more corresponding encryption keys; and (h.) transferring the results of said at least one query from said database server to said client.

The Structure Preserving Database Encryption method for a database encryption, said database consisting of at least one table having one or more rows, columns and cells, comprising the steps of the encryption of each cell value: (a.) determining a value stored in a corresponding cell; (b.) determining the position of said cell within a database by determining said cell table, row and column identifiers; (c.) activating a function concatenating said cell table, row and column identifiers and as a result of said concatenating obtaining a number based on said identifiers; (d.) performing a XOR operation between said number and said value stored in said cell or concatenating said number with said value stored in said cell; and (e.) activating an encryption function on a result obtained from said XOR operation or said concatenating of said number with said value stored in said cell.

Preferably, the Structure Preserving Database Encryption method further comprises: (a.) activating a hash function on the result of the concatenating and as a result obtaining another number based on the cell table, row and column identifiers; (b.) performing a XOR operation between said another number and the value stored in the cell or concatenating said another number with said value stored in said cell; and (c.) activating an encryption function on a result obtained from said XOR operation or the concatenating of said another number with said value stored in said cell.

Preferably, the Structure Preserving Database Encryption method further comprises the steps of the decryption of each cell value: (a.) activating on an encrypted value a decryption function which decrypts said encrypted value and as a result a decrypted value is obtained; and (b.) performing a XOR operation between said decrypted value and the number obtained as the result of the concatenating the cell table, row and column identifiers.

Preferably, the Structure Preserving Database Encryption method further comprises the steps of the decryption of each cell value: (a.) activating on an encrypted value a decryption function which decrypts said encrypted value and as a result a decrypted value is obtained; and (b.) performing the XOR operation between said decrypted value and another number obtained as the result of activating the hash function or performing discarding said another number from said decrypted value.

The method for database encryption, wherein said database comprise an index consisting of values of at least one table having one or more rows, columns and cells, said method comprises the steps of the encryption of each index entry: (a.) determining a value stored in a corresponding cell; (b.) concatenating said value stored in said cell with a random number having a fixed number of bits or concatenating said value stored in said cell with a row identifier of said cell; and (c.) activating an encryption function on a result obtained from said concatenating.

Preferably, the method for database encryption, wherein said database comprise an index consisting of values of at least one table having one or more rows, columns and cells, said method further comprises the steps of the encryption of each index entry: (a.) obtaining an internal pointer to index entries; (b.) obtaining an external pointer to a corresponding row in a table wherein said value is stored; (c.) encrypting said external pointer by means of a conventional encryption function; and (d.) activating an authentication code function, said authentication code function: (d.1.) concatenating together: (i.) the value stored in the corresponding cell; (ii.) said internal pointer to index entries; (iii.) said external pointer said corresponding row in the table wherein said value is stored; and (iv.) an entry self pointer; and (d.2.) calculating a message authentication code value from said concatenating.

Preferably, the method for database encryption, wherein said database comprise an index consisting of values of at least one table having one or more rows, columns and cells, said method further comprises: (a.) defining a fixed size pool for each index, said pool holding one or more values for inserting into the corresponding index; and (b.) updating said each index with corresponding said one or more values only if said pool is full.

Preferably, the method for database encryption, wherein said database comprise an index consisting of values of at least one table having one or more rows, columns and cells, said method further comprises extracting corresponding values from the corresponding pool to the corresponding index in a random order.

A method for executing a client's query in an encrypted-index database, by means of a database server using sub-indexes, comprises: (a.) connecting to a database server by means of a client and identifying said client; (b.) creating a secure session between said database server and said client; (c.) transferring one or more encryption keys by means of said client to said database server; (d.) submitting a query by means of said client to said database server; (e.) locating corresponding sub-indexes which said client is entitled to access; (f.) executing said query on said corresponding sub-indexes by means of said database server using said one or more encryption keys; and (g.) transferring a result of said query to said client.

BRIEF DESCRIPTION OF THE DRAWINGS

In the drawings:

FIG. 4 discloses a database encryption employing a Structure Preserving Database Encryption (SPDE) method, wherein the structure of the database tables and indexes remain as before encryption, according to a preferred embodiment of the present invention;

Figure 1:
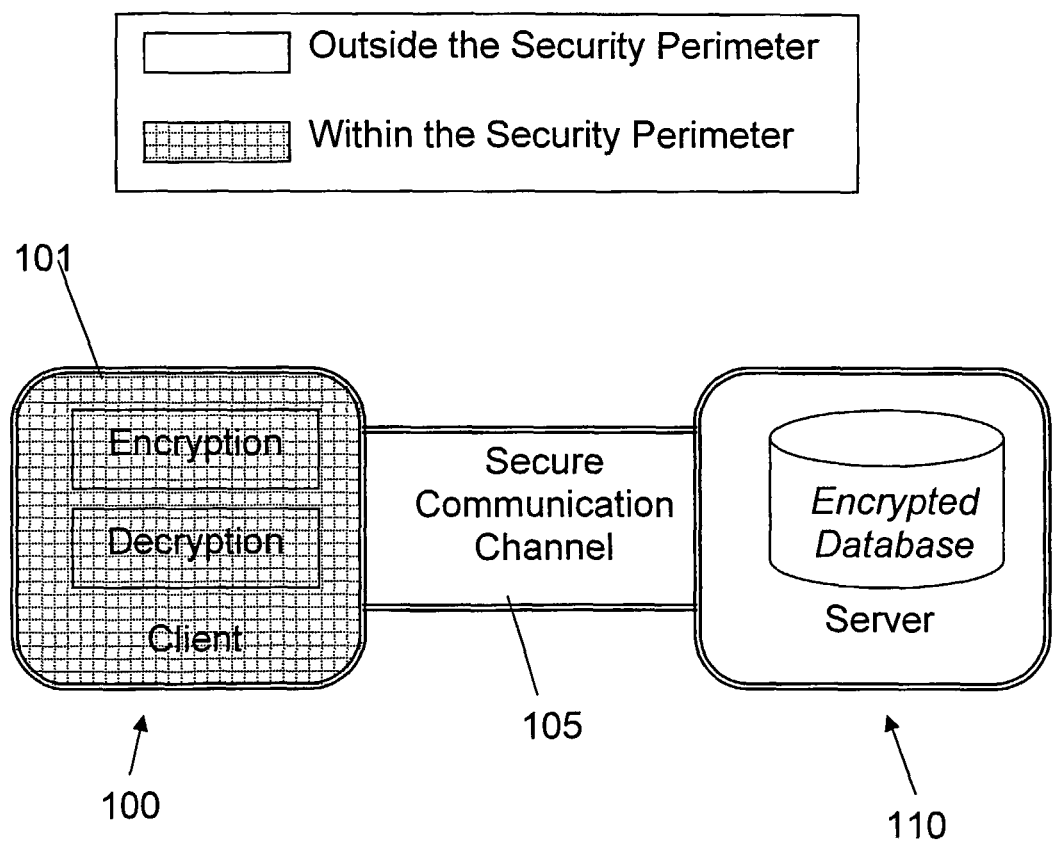
FIG. 1 illustrates the security perimeter in the DAS model, according to the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PREFERRED EMBODIMENTS

The recent explosive increase in Internet usage, together with advances in software and networking, has resulted in organizations being able to share data for a variety of purposes easily. This has led to new paradigm "Database as a service" (DAS) in which the whole process of database management is outsourced by enterprises in order to reduce costs and, to concentrate on the core business.

FIG. 1 illustrates the security perimeter in the DAS model, according to the prior art. Client 100 performs encryption and decryption operations within the security perimeter 101 while the database server 110, not being trusted, remains outside the security perimeter. In such cases where the database server 110 is not trusted, the process of encryption can not be performed by said server 110. Defining the encryption method under the assumption that server 110 is not trusted raises many questions. One core issue is query processing in the DAS model since the data is stored encrypted and the server has no access to the encryption keys. One way to implement a query in the DAS model is to transfer the data from the untrusted servers to the security perimeter 101. Once inside the security perimeter 101, data can be decrypted and the query processed. However, not only this approach is not practical for large databases, it also implies that only the storage is outsourced. Furthermore, the server is expected to be able to perform database operations, such as checking constrains, building indexes, ensuring consistency and executing queries.

Figure 2:
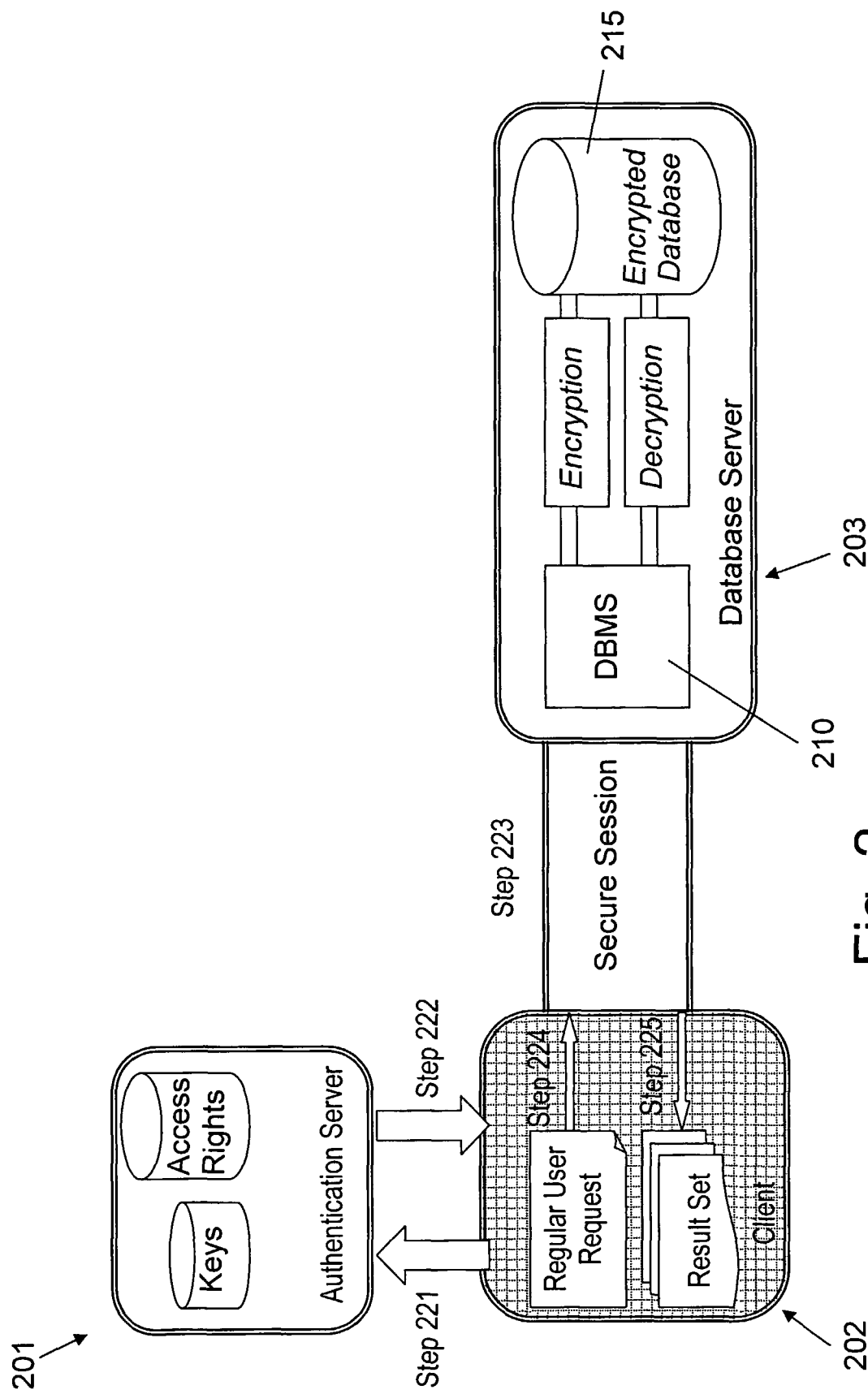
FIG. 2 is a schematic illustration of the system architecture of the Structure Preserving Database Encryption (SPDE) method, according to a preferred embodiment of the present invention.

FIG. 2 is a schematic illustration of the system architecture of the Structure Preserving Database Encryption (SPDE) method, according to a preferred embodiment of the present invention. Client 202 generates SQL commands (queries) and receives results to said queries from database server 203. Client 202 is responsible for generating a session and transferring encryption keys to Database Server 203. The encryption keys are used during the generated session by means of Database server 203 for encryption and decryption operations needed for performing queries of Client 202. Database server 203 is used for performing SQL commands by means of Database Management System (DBMS) 210, said commands received from Client 202 by use of encryption keys also received from said Client 202. Encryption database 215 comprises the encrypted data. Authentication Server 201 comprises the encryption keys of Client 202. Client 202 wishing to perform queries from Database server 203 has to be identified by Authentication Server 201 in order to receive the encryption keys. After Client 202 was identified by Authentication Server 201, the encryption keys are transferred from said Authentication Server 201 to Client 202. Then Client 202 transfers the encryption keys to Database Server 203.

It should be noted, that Client 202 according to all preferred embodiment of the present invention, refers to a computer and/or to a person.

At step 221, Client 202 identifies itself to Authentication Server 201 by means of a conventional identification protocol, such as Kerberos. After Client 202 was identified by Authentication Server 201, at step 222 Client 202 receives the encryption keys, which are relevant for performing said Client 202 queries, according to said Client 202 access right definition. Each client can have different encryption keys according to his access right definition for accessing various data tables stored in Database Server 203. Client 202 wishing to access data to which he does not have a corresponding encryption key, is not able to decrypt said data, since he does not have an encryption key by use of which said data was encrypted. Then at step 223, Client 202 generates a session with Database Server 203 and transfers to said Database Server 203 the corresponding encryption keys, which are used by Database Server 203 for performing queries received from Client 202. At step 224, Client 202 generates a query (an SQL at least one command is sent to Database Server 203). At step 225, Database Server 203 searches Encrypted Database 215 for the corresponding data requested in the above query, and after such data is found, said data is decrypted by means of the corresponding encryption keys. The results of the above query are transferred from Database Server 203 to said Client 202 in non-encrypted form, and therefore Client 202 does not need to perform any decryption operation on said results.

The system architecture of FIG. 2 ensures that, after a secure session is created, the whole process of encryption and decryption performed by Database Server 203 is transparent to Client 202.

The system and method, according to a preferred embodiment of the present invention, assumes that the database server is trusted. That is, all encryption and decryption operations will be performed on the server. In order to perform these operations, all the necessary encryption keys should be accessible to the server during the valid session a logged-on user. These keys should be retained only in the server's memory during the session. The encryption method introduces a new line of defense for "data at rest": a DBA managing the database has no access to any of the encryption keys, and learns nothing about the database values. Furthermore, an intruder managing to break into the database and read the stored data cannot learn anything about the database values. Moreover, when the data is backed up, only the encrypted form of the data is stored on the backup site, thus the data is secured against data disclosure.

Figure 3:
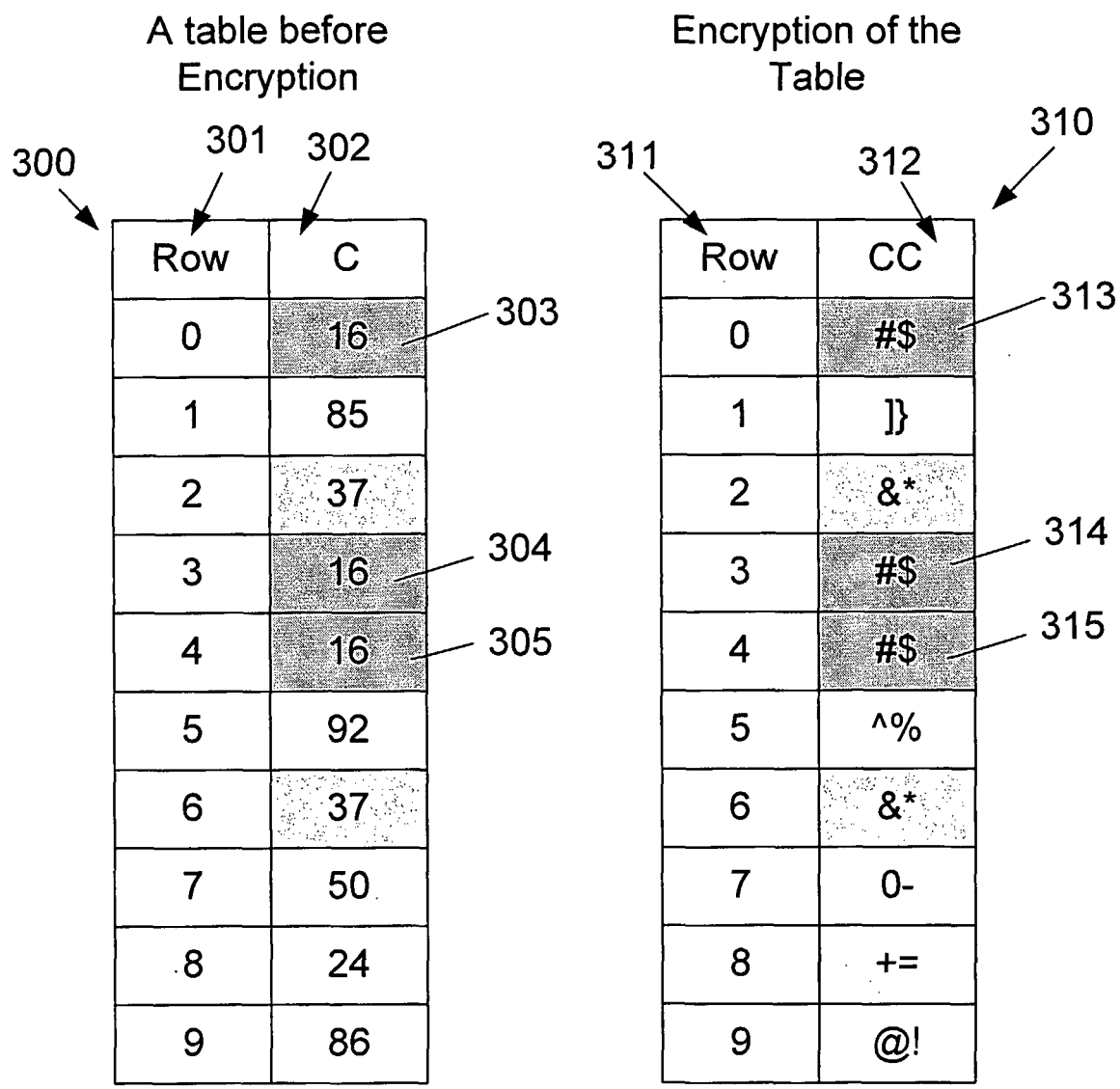
FIG. 3 illustrates a database encryption method, according to the prior art.

FIG. 3 illustrates a database encryption method, according to the prior art. A table 300 has, for example, one data column "C" numbered 302 and ten Rows (a column showing the identifiers of rows is numbered 301). A table 310, which is the encryption of table 300, also has, for example, one data column "CC" numbered 312 and ten Rows (a column showing the identifiers of rows is numbered 311). The equal plaintext values in table 300 are encrypted to the corresponding equal ciphertext values in table 310. For example, cells 303, 304 and 305 in table 300 have equal values of "16". As a result, in table 310 the corresponding cells 313, 314 and 315 also have equal ciphertext values "#$". Therefore, this prior art method is sensitive to substitution attacks, attempting to switch encrypted values and to patterns matching attacks, attempting to gather statistics based on the database encrypted values.

FIG. 4 discloses a database encryption employing a Structure Preserving Database Encryption (SPDE) method, wherein the structure of the database tables and indexes remain as before encryption, according to a preferred embodiment of the present invention. A table 300 has, for example, one data column "C" numbered 302 and ten Rows (a column showing the identifiers of rows is numbered 301). A table 320, which is the encryption of table 300, also has, for example, one data column "CCC" numbered 322 and ten Rows (a column showing the identifiers of rows is numbered 321). Each database cell value in table 320 is encrypted with its cell coordinates and therefore, the equal plaintext values in table 300, for example the values "16" in cells 303, 304 and 305 are encrypted to the corresponding different ciphertext values in table 320.

Therefore, the SPDE method, according to a preferred embodiment of the present invention, has two immediate advantages. First, it eliminates substitution attacks attempting to switch encrypted values. Second, patterns matching attacks attempting to gather statistics based on the database encrypted values would fail.

The SPDE system and method ensure that database tables and indexes can be managed as usual by a DBA in their encrypted form, while keeping the data secure. Furthermore, since the database structure remains the same, queries are not changed because of the encryption. This ensures that existing applications can use the encrypted database without the need for any changes in the application software. The basic assumption behind the SPDE method is the existence of an internal cell identifier which is beyond the reach for an adversary and thus, is tamper proof. Most of the commercial DBMS such as Oracle® and MS-SQL® generate row-ids for each record. Row-id is a pointer to a database row defining the physical location of that row in the database. Thus, if changed, the row-id will no longer identify the same row. The existence of row-ids ensures that SPDE method is applicable in commercial databases. The position of a cell in the database is unique and can be identified using the triplet that includes its Table ID (identification), Row ID, and Column ID. This triplet hereinafter is referred as the cell coordinates.

According to a preferred embodiment of the present invention, each database value is encrypted with its unique cell coordinates. These coordinates are used in order to break the correlation between ciphertext and plaintext values in an encrypted database.

Encryption/Decryption in SPDE System and Method

Let define:

$V_{trc}$—A plaintext value located in table t, row r and column c.:

$\mu: (N \times N \times N) \rightarrow N$—a function generating a unique number based on the database coordinates.

$Enc_k$—A function which encrypts a plaintext value with its coordinates. The encryption of the plaintext value $V_{trc}$, according to a preferred embodiment of the present invention, is defined by the following equation:

$$Enc_k(V_{trc}) = E_k(V_{trc} \oplus \mu(t,r,c))$$

where k is the encryption key, $\oplus$—is a XOR logical operator and $E_k$ is a symmetric encryption function (e.g. DES, AES).

$X_{trc}$—A ciphertext value located in table t, row r and column c.

$$X_{trc} = Enc_k(V_{trc})$$

It should be noted, that in order to cope with the statistical attacks according to another preferred embodiment of the present invention, a hash function is activated on $\mu(t,r,c)$, and as a result a number based on the cell identifiers: t, r and c is obtained. Then a XOR logical operation is performed between the plaintext value $V_{trc}$, located in the table t, row r and column c, and the above number obtained as the result of the hash function activating on $\mu(t,r,c)$. Then the result of the XOR logical operation is encrypted by the symmetric encryption function $E_k$ obtaining $Enc_k(V_{trc})$.

The decryption of the ciphertext value $X_{trc}$, according to a preferred embodiment of the present invention, is defined by the following equation:

$$Dec_k(X_{trc}) = D_k(X_{trc}) \oplus \mu(t,r,c) = V_{trc}$$

where k is the decryption key, $D_k$ is a symmetric decryption function and $Dec_k$ is a function which decrypts the ciphertext value ($X_{trc}$) and discards its coordinates.

In order to decrypt the ciphertext value $X_{trc}$, in case when the hash function was activated on $\mu(t,r,c)$ during the encryption, the decryption of said ciphertext value $X_{trc}$ comprises the following steps:

activating the symmetric decryption function $D_k$ on said ciphertext value $X_{trc}$; and performing the XOR logical operation between the result obtained from said symmetric decryption function ($D_k$) activating and the result obtained from the hash function activating on $\mu(t,r,c)$.

Encryption ensures that a user not possessing the encryption key can not modify a ciphertext value and predict the change in the plaintext value. Usually the range of valid plaintext values is significantly smaller than the whole range of possible plaintext values. Thus, the probability that an unauthorized change to a ciphertext value would result in a valid plaintext value is negligible. Therefore, unauthorized changes to ciphertext values are likely to be noticed at decryption time (the decrypted value will be meaningless).

Substitution attacks as opposed to patterns matching attacks can not be prevented by simply using encryption. In the SPDE method, each value is encrypted with its unique cell coordinates. Therefore, trying to decrypt a value with different cell coordinates (e.g. as a result of a substitution attack) would probably result in an invalid plaintext value.

If the range of valid plaintext values is not significantly smaller than the whole possible range, or invalid plaintext values can not be distinguished from valid plaintext values, encryption has to be carried out as follows:

$$Enc_k(V_{trc}) = E_k(\mu(t,r,c) \| V_{trc})$$

Since $\mu(t,r,c)$ is concatenated to the plaintext value before encryption, attempting to change the ciphertext value or trying to switch two ciphertext values would result in a corrupted $\mu(t,r,c)$ after decryption. Obviously, concatenating $\mu(t,r,c)$ results in data expansion. It should be noted, that in order to cope with the statistical attacks, according to another preferred embodiment of the present invention, a hash function is activated on $\mu(t,r,c)$, and as a result a number based on the cell identifiers: t, r and c is obtained. Then this number is concatenated with $V_{trc}$ and encrypted by the symmetric encryption function $E_k$ obtaining $Enc_k(V_{trc})$.

The decryption process for decrypting the encrypted value $X_{trc}$ ($X_{trc} = Enc_k(V_{trc})$) in case when the encryption was performed by concatenating the result of the hash function activating to the plaintext value before encryption, comprises the following steps:

activating the symmetric decryption function $D_k$ on $X_{trc}$ and as a result obtaining a decrypted value $D_k(X_{trc})$; and discarding said result of said hash function activating from said decrypted value $D_k(X_{trc})$.

It should be noted, that the operation of discarding is an opposite to the operation of concatenating.

Figure 5:
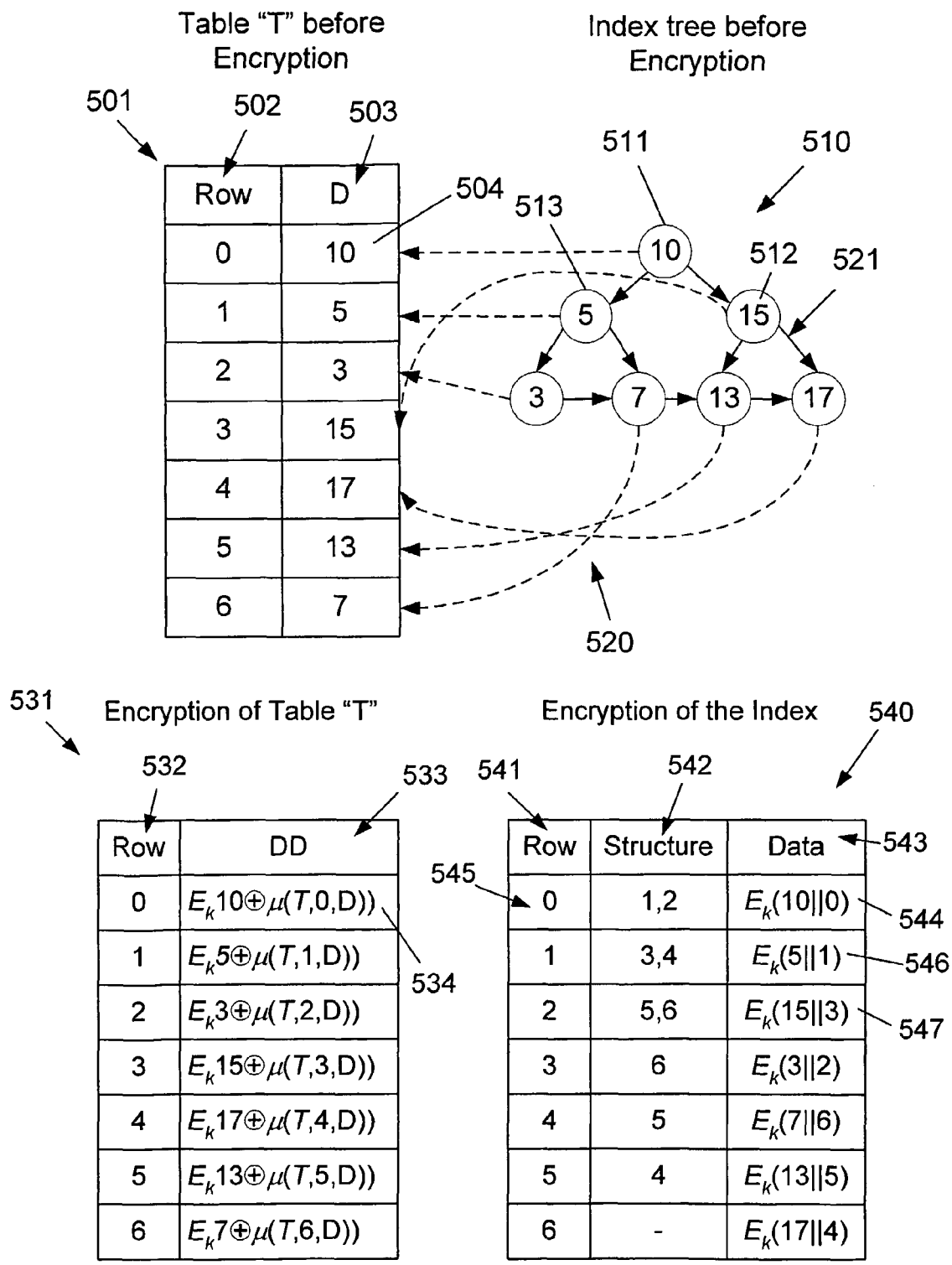
FIG. 5 is a schematic illustration of a database and index encryption, according to a preferred embodiment of the present invention.

FIG. 5 is a schematic illustration of a database and index encryption, according to a preferred embodiment of the present invention. An exemplary table 501 identified by "T" is a conventional table in a database. Table 501 has, for example, one data column "D" numbered 503, and seven Rows (a column showing the identifiers of rows is numbered 502). Suppose that a user wishes to encrypt data column "D" 503. Index tree before encryption 510 presents the index links which would be created if column 503 of the table 501 should not be encrypted. Each value of column "D" 503 is represented as a node in Index tree before encryption 510. For example, the value of "10" numbered 511 is a root of tree 510, positioning at the highest level of said tree 510. The root of "10" has two sons "15" and "5", numbered "512" and "513", respectively. The index pointers are divided into the two types of pointers illustrated by means of dashed and solid lines numbered 520 and 521, respectively. Solid lines 521 represent internal index pointers defining the structure of index tree 510 (defining root "10" numbered 511 of index tree 510 and defining sons of each node, such as node 512 or 513 of said index tree 510). Dashed lines 520 are external index pointers to table 501 rows, such as row identified by "0" or "1". These external index pointers point the rows, wherein the corresponding value of each node of index tree 510 is located.

According to a preferred embodiment of the present invention, external index pointers represented by dashed lines 520 are concealed in order not enable the adversary to know the link between the values of nodes in index tree 510 and the corresponding position of said values in table 501. Since internal index pointers represented by solid lines 521 are important for performing various administrative operations, they remain not concealed.

Encrypted exemplary table 531 of table "T" 501 comprises one data column "DD" numbered 533, and seven Rows (a column showing the identifiers of rows is numbered 532). At column "DD" numbered 533 each corresponding value of table 501 is encrypted by means of the symmetric encryption function $E_k$, such as DES, AES. k is the encryption key, $\oplus$—is a XOR logical operator and $\mu(T,R,D)$ is a function generating a unique number based on the database coordinates, wherein "T" is a table identifier, "R" is a row identifier and "D" is a column identifier of each corresponding value in table 501. Each cell value is encrypted with its unique cell coordinates. For example, value "10" is positioned in table "T" 501, in row "0" and in column "D" numbered 503. Therefore, the position of the value "10" is defined by (T, 0, D), as indicated in cell 534. After the unique position of value "10" was identified, $\mu$ function is activated on said unique position: $\mu(T,0,D)$. As a result, $\mu$ function generates a number (value) from the set of three numbers: "T", "0" and "D". Then, $\oplus$ (XOR) operation is performed between the value of "10" and the above number generated by $\mu$ function, as indicated in cell 534: $10 \oplus \mu(T,0,D)$. Then $10 \oplus \mu(T,0,D)$ is encrypted by means of the symmetric encryption function $E_k$, such as DES, AES, wherein k is the encryption key: $E_k(10 \oplus \mu(T,0,D))$, as indicated in cell 534.

Encrypted exemplary index table 540 comprises a data column "Data" numbered 543, structure column 542 and seven Rows (a column showing the identifiers of rows is numbered 541). Index table 540 comprises the encrypted index of index tree 510 represented in a form of a table, since said index is stored in a database in this form. Structure column 542 comprises values of internal index pointers represented by solid lines 521 in index tree 510. For example, in row identified by "0" the values that are indicated in structure column 542 are "1" and "2". These values are related to rows "1" and "2" of table 540, said rows "1" and "2" comprise encrypted data relating to values "5" and "15" of index tree 510 (values "5" and "15" are indicated in the left part of symmetric encryption functions $E_k(5\|1)$ and $E_k(15\|3)$ numbered 546 and 547, respectively). The encrypted data of row "0" is related to value "10" of index tree 510 (value "10" is indicated in the left part of symmetric encryption function $E_k(10\|0)$). Nodes having values of "5" and "15" are the sons of a node having the value of "10" and this is the reason why rows identifiers "1" and "2" in table 540 (said rows "1" and "2" comprise encrypted values of data related to values "5" and "15") are located in row "0".

Since the internal index pointers in structure column 542 remain not concealed, it is possible to perform various administrative operations on index tree 510 represented in the form of the table 540. In data column 543 the value of each node of index tree 510 is concatenated to the value of the corresponding external index pointer to table 501. For example, the value of "10" is concatenated to the value of the external index pointer to row identified by "0", since "10" is located in table 501 in row number "0": $10\|0$. Then, the result of concatenation of "10" and "0" is encrypted by means of the symmetric encryption function $E_k$, such as DES, AES, wherein k is the encryption key: $E_k(10\|0)$, as indicated in cell 544. Therefore, as a result each index value is concatenated with its unique row identifier. Although index tree 510 can comprise equal values of a number of nodes, these values are encrypted to different values, since the corresponding different row identifiers are concatenated with each of said equal values.

The use of cell coordinates for the encryption of the database table and of row identifiers for the index entries, according to a preferred embodiment of the present invention, ensures that there is no correlation between the indexed values and the database ciphertext values.

Implementing a Secure µ Function

The implementation of µ affects the SPDE method and system ability to protect against substitution and statistical attacks.

Substitution attacks—A secure implementation of µ would generate different numbers for different coordinates in order to protect against substitution attacks:

$$(t_1,r_1,c_1) \neq (t_2,r_2,c_2) \longleftrightarrow \mu(t_1,r_1,c_1) \neq \mu(t_2,r_2,c_2)$$

Unfortunately, generating a unique number for each database coordinate would result in considerable data expansion. An alternative implementation reducing the data expansion might also result in collisions.

It is assumed that there are two cells, for which µ generates two equal values for their coordinates:

$$\exists t_1,r_1,c_1,t_2,r_2,c_2 | [(t_1,r_1,c_1) \neq (t_2,r_2,c_2)] \wedge [\mu(t_1,r_1,c_1) = \mu(t_2,r_2,c_2)]$$

It is possible to substitute the ciphertext values of these cells ($x_{t_1 r_1 c_1}$ and $x_{t_2 r_2 c_2}$) without µ being corrupted at decryption time. If it is hard to find two cells such as those mentioned above, this kind of attack can be prevented by using a hash function, for example MD5.

Statistical attacks—A secure implementation of µ generating different numbers for different coordinates would affect the ciphertext values so that there would be no correlation between the plaintext and the ciphertext value and thus, would protect against statistical attacks. However, statistical attacks can be performed on the encrypted values even if µ that generates different numbers for different coordinates when block cipher techniques such as CBC (content block chaining) are used. In the SPDE method, the unique cell identifiers size might be larger than the size of one block. It is assumed that a block cipher such as CBC is used as the encryption function and a specific implementation of µ concatenating the coordinates of a cell in order to create a unique representation of its location is used, as follows:

$$\mu(t,r,c) = t \| r \| c$$

For example, if t=324, r=451 and c=372, then µ(t,r,c)= t∥r∥c=324451372.

The combination of block ciphers with the above implementation of µ cause information leakage which could be used for statistical attacks. For example, for values located at cells at the same table, the same column and subsequent rows, the unique values created by µ will only be different at the least significant bit. If the number of bytes used in order to represent µ is larger than the block size in the block cipher used, the first blocks of the two encrypted values will be equal if and only if the first blocks in the plaintext values are equal. The first blocks will probably hold most or all the sensitive data and thus, statistical attacks are possible by examining the equality of the first blocks of the ciphertext values.

In order to cope with statistical attacks, a secure µ function has to produce values with low probability of collision in said µ function first block. According to a preferred embodiment of the present invention, this goal is achieved by activating a hash function on µ(t,r,c), said hash function generating a hash value from the cell coordinates that always affects the first block in the block cipher. This value is used in order to change the first block of the plaintext value before encryption. Since a collision-free hash function is used, even cell coordinates have equal first blocks and therefore, only a slight change in the least significant bits produces different first blocks using the hash function. Thus the statistical attacks are ruled out, since if the first blocks in CBC mode are different, then the whole encrypted cell is different.

Revocation

Since cell coordinates only relate to the physical location of said database cell in the SPDE method and system, according to a preferred embodiment of the present invention, substitution attacks that substitute a database cell with one of its previous versions would succeed. What is needed is to add another dimension, that of time, to each cell. If database cells were encrypted with another dimension, the validity of the version of that encrypted value can be verified just as it was verified that the value is in its correct logical location.

In order to illustrate the need of the additional dimension, a possible attack scenario is described. It is assumed that a database administrator applies the above attack to his account balance just after withdrawing $10,000. Since the account balance values before and after the withdrawal are valid database encrypted cells, both located in the same database coordinates and encrypted with the same key, no one could detect the attack performed by the DBA since all values are valid (encrypted with the right key and using the correct cell coordinates).

Three ways to cope with this attack are suggested:
1. In the Oracle database, a special pseudo-column is used to represent the version of each row within each table. Using this as a representation of the version of a cell would result in the need to re-encrypt the whole row after a particular cell of that row was changed, thus, the structure of the database would change.
2. If the update operation, as two subsequent delete and insert operations, is selected, then the inserted row will be assigned to a different row-id and thus the updated value will be assigned to different cell coordinates. The above attack would then be eliminated. In this approach, the whole row is affected after a cell is updated and again the structure of the database would change. However, this representation can be satisfactory when applying the model on bi-temporal databases where there are no updates, only logical deletes that can be referred to as updates on the whole row being deleted. What is needed is a representation of a version at the level of cells that can be used together with the other cell coordinates in order to create a complete representation of time (version) and place (logical database location) of each database cell.
3. A unique value can be added to each newly inserted cell that uniquely identifies the value among all the created values before encryption. A database sequence can be used in order to create such values. When a value is updated, its previous unique value is added to a revocation list including all values updated but are now revoked. When a database query is executed the unique value of the current cell is extracted and checked against the revoked list to check if the value has been revoked. If not, the value is returned to the user. Obviously, using this approach adds high overheads for databases with frequent update operations.

A Proposed Encrypted Indexing Method for Supporting the SPDE Method

The SPDE method suggests how to construct a secure index on the encrypted database, so that the time complexity of all queries is maintained. Furthermore, since the database structure remains the same no changes are imposed on the queries.

A secure database index, encrypted at the single values level of granularity is suggested. Best performance and structure perseverance are simply obtained, since single values granularity encryption is used. Information leakage and unauthorized modifications are protected against using encryption, dummy values and pooling. In addition, a technique that supports discretionary access control in a multi-user environment is presented.

Index Encryption

Let assume that a conventional (standard) index entry is of the form:

$(V_{trc}, IRs, ER)$, where:

$V_{trc}$—An indexed value in table t, row r and column c.
IRs—The internal pointer (reference) (pointers between index entries)
ER—The external pointer (reference) (pointers to the database row).

An entry in the secure index, according to a preferred embodiment of present invention, is defined as follows:

$(E_k(V_{trc}), IRs, E'_k(ER), MAC_k(V_{trc}\|IRs\|ER\|SR))$, where:

k—An encryption key.
$E_k$—A nondeterministic encryption function.
$E'_k$—A conventional encryption function.
SR—The entry self pointer (reference), which determines the position of the corresponding node in the index. SR is used as a node identifier of the corresponding index.
$MAC_k$—A message authentication code function.

The implementation of $E_k$ introduces a tradeoff between static leakage and performance. If $E_k$ is a non-deterministic encryption function (that is, equal plaintext values are encrypted to different ciphertext values), statistics such as the frequencies and distribution of values are concealed, but comparing index values requires their decryption. On the other hand, if $E_k$ is an Order Preserving encryption function, some information about the index values is revealed (e.g., their order), but it is possible to compare values without the need to decrypt them. If $E_k$ is an Equality Preserving encryption function, then equal plaintext values are encrypted to equal ciphertext values.

This tradeoff between Security and Performance for $E_k$ implementation is shown in Table 2.

TABLE 2

The Tradeoff between Security and Performance for $E_k$ implementation.

|  | Security | Performance |
|---|---|---|
| Nondeterministic | High | Worst |
| Equality Preserving | Medium | Low |
| Order Preserving | Low | Medium |
| No Encryption | Worst | High |

It is suggested to use a non-deterministic $E_k$ encryption function. A possible implementation of $E_k$ is:

$E_k(x) = E''_k(x\|r)$, where:

k—An encryption key.
$E''_k$—A conventional encryption function.
r—A random number with a fixed number of bits.

Using the above implementation of $E_k$ there is no correlation between $E_k(V_{trc})$ and the corresponding column ciphertext value (random numbers are used before encryption) and thus linkage leakage attacks are eliminated.

Most commercial databases implement indexes like tables (as heap files). In this implementation, index entries are uniquely identified using the pair: page id defined hereinafter as SR and slot number defined hereinafter as IR.

Message authentication codes (MAC) are used to protect against unauthorized modifications of messages. They mix the message cryptographically under a secret key, and the result is appended to the message. The receiver can then recompute the MAC and verify its correctness. It should be impossible for an attacker to forge a message and still be able to compute the correct MAC without knowing the secret key.

According to a preferred embodiment of the present invention, a $MAC_K$ function is used in order to protect the index entries against unauthorized modifications.

Spoofing attacks are eliminated, since the MAC value depends on $V_{trc}$, and once $E_k(V_{trc})$ is tampered with, $V_{trc}$ will not match the $V_{trc}$ used in the MAC.

Splicing attacks are eliminated since the MAC value depends on SR and trying to substitute two encrypted index entries will be detected, since SR would not match the SR used in the MAC.

Replay attacks can be eliminated by adding a time dimension to each index node. This enables the validity of the node version to be verified, just as ER was used in order to verify its logical location.

The MAC value added to each index entry causes data expansion and thus, its size introduces a tradeoff between security and data expansion.

The following pseudo-code, according to a preferred embodiment of the present invention, illustrates a query evaluation using the encrypted index, which is assumed to be implemented as a binary tree. However, the pseudo-code can be easily generated to handle a B-Tree implementation, according to another preferred embodiment of the present invention.

```
INPUT:
    A table: T
    A column: C
    A value: V
    A query: SELECT * FROM T WHERE T.C>=V
OUTPUT:
    A collection of row-ids.
X := getIndex(T, C).getRootNode( );
While (not X.isLeaf( )) Do
    If (not x.isValid( ))
        Throw IllegalStateException( );
    Else
        If X.getValue( )<V Then
            X := X.getRightSonNode( );
        Else
            X := X.getLeftSonNode( );
        End If;
    End If;
End While;
RESULT := { };
While X.getValue( )<V Do
    X := X.getRightSiblingNode( );
End While;
While X is not null Do
    RESULT := RESULT union {X.getRowId( )};
    X := X.getRightSiblingNode( );
End While;
Return RESULT;
```

While is Leaf, getRightSonNode, getLeftSonNode and getRightSiblingNode functions relate to the index structure and their implementation does not change, getValue and getRowId functions are implemented differently so that encryption and decryption support is added. The function isValid verifies the index entry integrity using the MAC value.

Performance can be furthermore improved, if entries verification is performed periodically on the entire index and not as part of each index operation.

Using Dummy Values and Pooling

In order to cope with dynamic leakage attacks, it is needed to reduce the level of confidence an adversary has about the effect of new inserted data on the database indexes. There is a tradeoff between how much of the index is updated and how much information an adversary is able to learn.

According to a preferred embodiment of the present invention, two techniques for reducing the adversary level of confidence are proposed:
 a. Dummy values; and
 b. Pooling.

Dummy values can be inserted to the index with each insertion made by the user, and thus reduce the level of confidence. However, inserting dummy values with each insertion results in data expansion. The number of dummy values added in each insertion determines the level of confidence, which an adversary has about the position of a value within the index.

The meaning of pooling is to collect coming elements to a temporary data structure (the pool), and in a given time, the whole data structure is emptied and its elements are inserted to the original data structure they were originally meant to be inserted to.

Figure 6A:
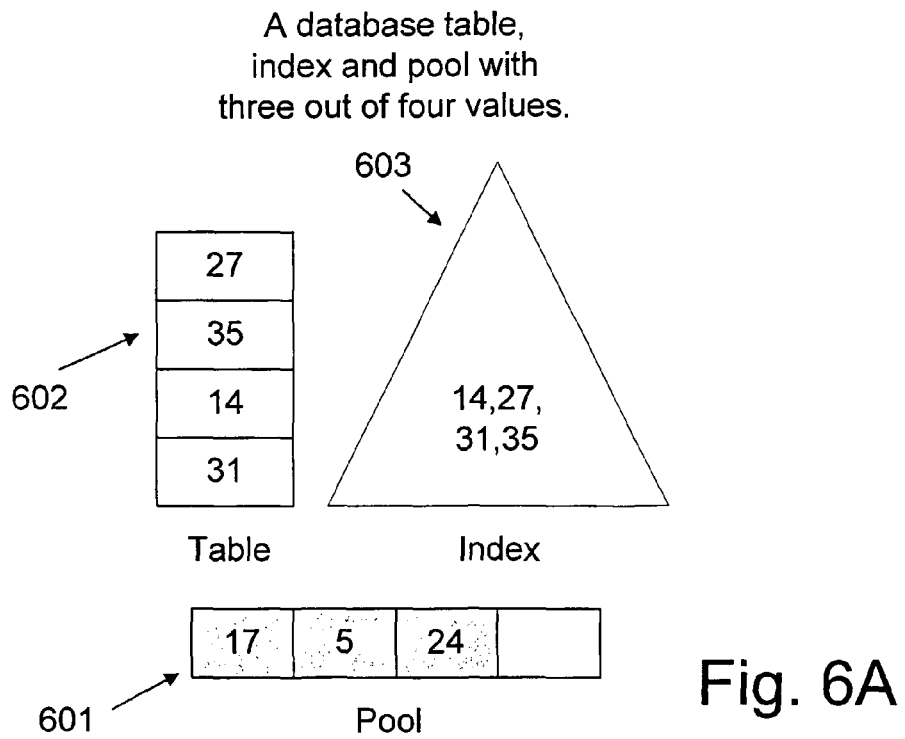
FIG. 6A and FIG. 6B are schematic illustrations of a database Index using pooling, according to a preferred embodiment of the present invention.
Figure 6B:
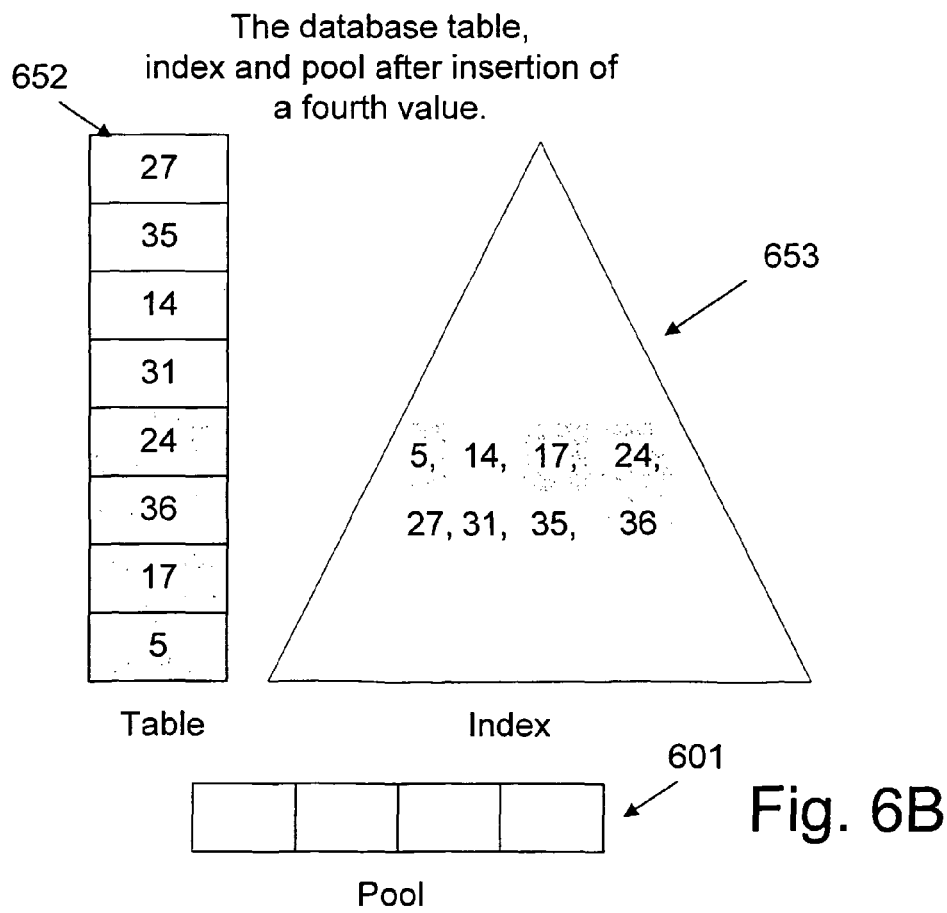

FIG. 6A and FIG. 6B are schematic illustrations of database indexing using pooling, according to a preferred embodiment of the present invention. It is suggested to use pooling for security reasons. A fixed size pool 601 is defined for each index 603, said pool holding the new inserted values. Only when pool 601 is full, index 603 is updated with these values. Furthermore, the extraction of values from pool 601 to index 603 should be done in a random order, since it makes it difficult to link the extracted values and their corresponding inserted values. When a query is to be executed, it is first needed to search the pool 601, and then to search the rest of the index. The pool size determines the level of confidence, which an adversary has about the position of a value within index 603. A full scan has to be performed on pool 601 whenever index 603 is used. Thus, the size of pool 601 is a privacy-performance tradeoff. Using a pool size that has space complexity of O(log|table size|) will not affect the time complexity of the queries.

Using pool 601, the adversary can not link an inserted database value to its corresponding index value—the only thing he can do is to link a group of inserted database values and a group of inserted index values. The adversary can not link a single database value to its corresponding index value. The size of the pool (or the size of the group) determines the level of confidence an adversary has about the position of a value within the index.

FIG. 6A illustrates the database table 602, index 603 and pool 601 after the insertion of, for example, three values: 17, 5, 24 where the pool size is four values. FIG. 6B illustrates the database table 652, index 653 and pool 601 after the insertion, for example, of a fourth value: 36, that fills the pool. After the insertions of the first three values, index 603 is not updated, all the values are added to pool 601 only. After the insertion of the fourth value—36, pool 601 is emptied, and all of its values are added to index 603 generating a new index 653. It means that the adversary has a probability of ¼ (0.25) to link a database value (one of the four inserted values) with its corresponding index value.

If the values are extracted from pool 601 in the same order that they were inserted, then the adversary can still link the database value with its corresponding index value (the first database value with the first value that is extracted from the pool, the second with the second and so on). Therefore, in order to solve this problem, according to a preferred embodiment of the present invention, the values are extracted from the pool in a random order.

When a query is to be executed, first it is needed to search pool 601, and then to search the rest of the index. A full scan has to be performed on pool 601 whenever the index is used. Thus, the size of pool 601 is a privacy-performance tradeoff. Using a larger pool means a lower level of confidence for the adversary, however it requires more time. Using a pool size that has space complexity of O(log|table size|) does not affect the time complexity of the queries, since searching index 603 or 653 is of the same space complexity.

Pool 601 should be kept in a secure memory location in the server, so that the adversary is not able to observe dynamic changes in the pool itself. Such secure places can easily be achieved using dedicated hardware.

Supporting DAC in Indexes

If indexes are used only by one user or if they are never updated, it is possible to maintain a local index for each user. Securing indexes stored locally is relatively easy. However, such local indexes do not work well in a multi-user environment, since synchronizing them is difficult. Thus, it is necessary to store the indexes in one site, such as the database server, and share them between users. A fundamental problem arises when multiple users share the same encrypted index and each user has different access rights.

According to a preferred embodiment of the present invention, a solution to this problem is suggested: splitting the index into several sub-indexes where each sub-index relates to values in the column encrypted using the same key.

Figure 7:
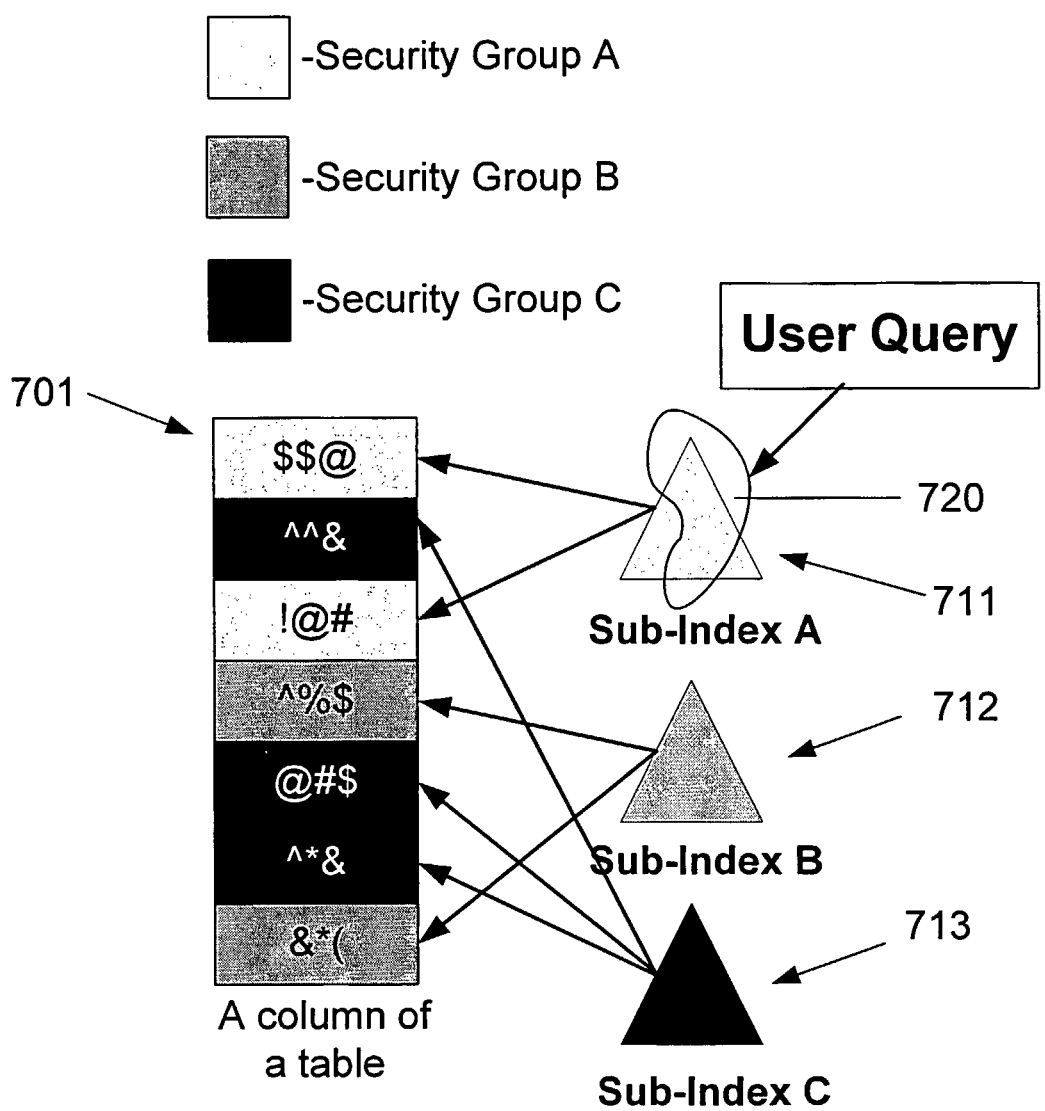
FIG. 7 illustrates the use of sub-indexes, according to a preferred embodiment of the present invention.

FIG. 7 illustrates the use of sub-indexes, according to a preferred embodiment of the present invention. Different shades of colors of cells in a column 701 of a table mean different security groups—cells which are encrypted using different keys. After splitting the index into sub-indexes A, B and C numbered 711, 712 and 713 respectively, each sub-index is related to values in column 701 encrypted using the same encryption key, and each value of column 701 is referenced only by one sub-index, such as the sub-index A, B or C. In order to evaluate a query 720, only ciphertext values with the same access right are queried. All the values in each sub-index belong to the same security group (and thus encrypted using the same key), and thus the problem of accessing the entire index or the indexed elements by users who belong to different security groups is eliminated. Otherwise, the users who belong to different security groups could not access the entire index or the indexed values, since said entire index or the indexed values would be beyond their access right. When a value is inserted, it is inserted to the sub-index with the appropriate security group only. If this security group does not exist, a new sub-index is created.

When creating an index for column 701, the column is being marked as indexed but nothing is really created, since the encryption keys are missing. When a user queries column 701 for the first time or executes a dedicated command, the sub-indexes for his security groups are being created (if not exist already).

In order to create the sub-index, such as the sub-index A, B or C, it is needed to know which of the values of column 701 belong to the specific security group. According to a preferred embodiment of the present invention, this can be done in several ways:
 a. "Brute force"—trying to decrypt each of the column values. If succeeded to decrypt the above each value, then it belong to the specific security group, otherwise not.

b. "Forced Sub Indexes"—Supposing that each encrypted column, such as column 701 is indexed and thus when inserting a value to the database it is immediately inserted to the corresponding sub-index, such as the sub-index A, B or C.

c. "Explicit"—Each encrypted value is related to the corresponding security group, or for each security group a list of all its encrypted values is kept. Therefore, it is known what is needed to be added to the corresponding sub-index, such as the sub-index A, B or C.

Figure 8:
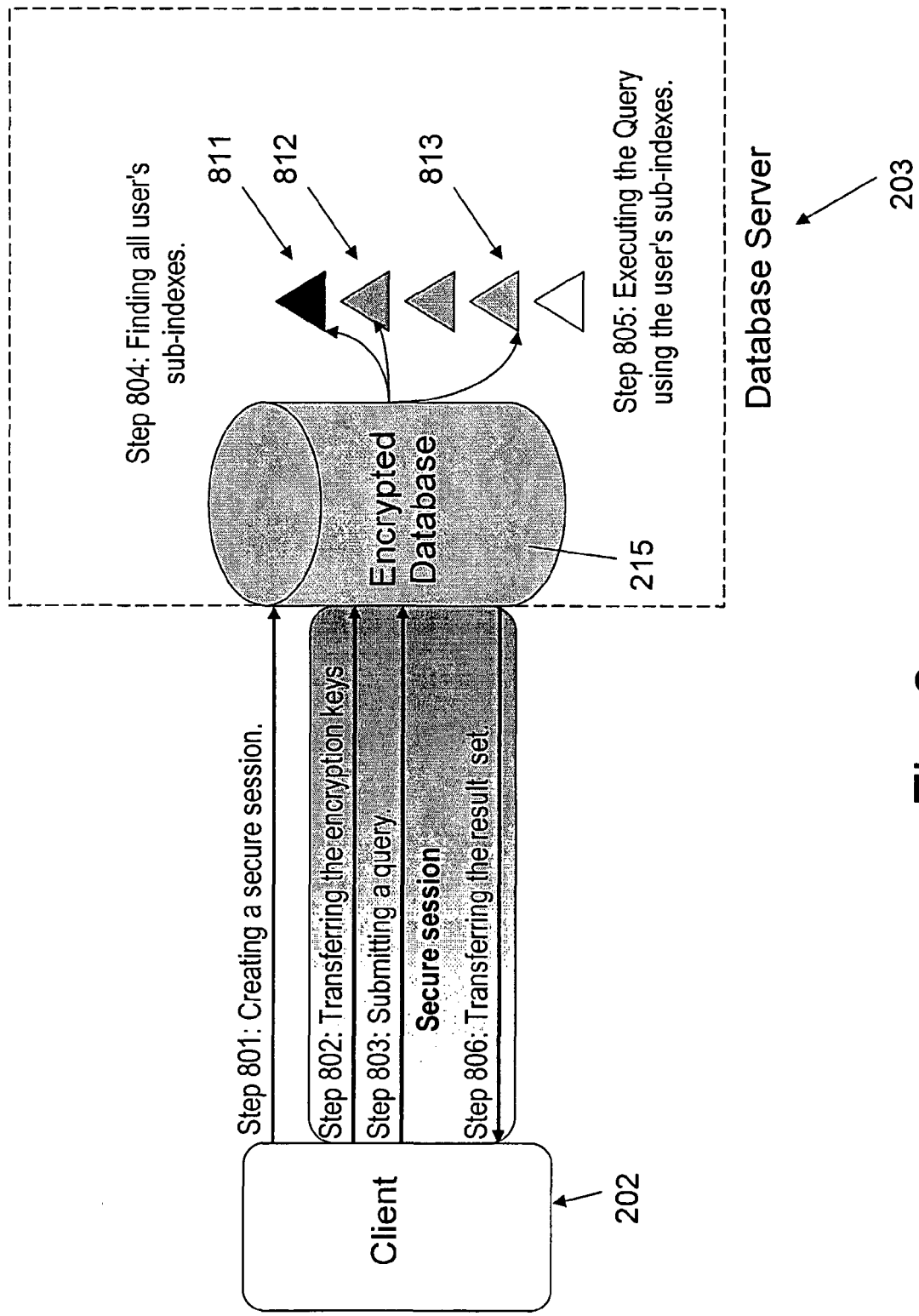
FIG. 8 illustrates how a query is executed using sub-indexes, according to a preferred embodiment of the present invention.

FIG. 8 illustrates how a query is executed using sub-indexes, according to a preferred embodiment of the present invention. First, client 202 connects to database server 203 and identifies himself, for example by using a smart card, such as a CompactFlash® card. After client 202 has been identified, a secure session between client 202 and database server 203 is created at step 801. In this secure session everything that is transmitted between client 202 and database server 203 is encrypted and secured, for example by using SSL. The client transfers his one or more encryption keys to database server 203 at step 802. The keys represent the security groups of client 202. The encryption keys can be supplied by means of the smart card. The encryption keys are revealed to database server 203 during the whole session. At step 803, during the secure session, client 202 submits queries to database server 203. At step 804, database server 203 is locating the sub-indexes 811, 812 and 813 which client 202 is entitled to access. This can be done if database server 203 maintains a directory that maps a security group to the corresponding sub-index. The security groups that database server 203 keeps are not the encryption keys themselves, since they are revealed. In order to determine the encryption keys, a simple calculation can be done by using a hash function (The security group is the hash value of an encryption key). At step 805, the query is executed on the corresponding located indexes 811, 812 and 813. The result of client's 202 query is transferred to said client 202 at step 806.

Analysis of the SPDE System and Method Properties

The proposed SPDE database encryption system and method, according to a preferred embodiment of the present invention, satisfies most of the desired properties of a database encryption method mentioned in the "Background" section:

1. Security—The security of the proposed SPDE database encryption system and method, according to a preferred embodiment of the present invention, relies on the security of the encryption algorithm used. In order to reveal some database value it has to be decrypted using the correct key. Thus, by employing strong encryption algorithms such as the AES while using a key size of 128 bit, the encryption method is computationally secure.

2. Performance—Encryption and decryption are fast operations and mandatory in any database encryption method. The proposed implementation adds the overhead of a XOR operation and μ computation which are negligible compared to encryption. Furthermore, the overhead of the proposed SPDE database encryption system and method, according to a preferred embodiment of the present invention, only adds a constant to the overall time complexity of the database operations.

3. Data Volume—Using encryption algorithms such as DES or AES which are block ciphers results in data expansion (in many cases this expansion is negligible) since the size of the cipher text is the multiplication of the block size. However, even when block ciphers are used, the database expansion caused by the new method is a constant and has no effect on the database size complexity.

4. Decryption Granularity—The basic element of reference is a database cell. Operations on a cell do not depend or have any effect on other cells.

5. Encrypting different columns under different keys—The proposed SPDE database encryption system and method, according to a preferred embodiment of the present invention, facilitates subschema implementation. Since each cell is encrypted separately, each column can be encrypted under a different key. Moreover, implementations needing row level access control can also be applied since each cell can be encrypted using a different key.

6. Resistance to patterns matching and substitution attacks—The proposed SPDE database encryption system and method, according to a preferred embodiment of the present invention, prevents patterns matching attacks since there is no correlation between a plaintext value and a ciphertext value (achieved by using encryption) and there is no correlation between various ciphertext values (achieved by using μ before encryption). Two equal plaintext values will be encrypted to two different ciphertext values since the database encryption method encrypts the values with their unique position. Substitution attacks are also prevented.

7. Unauthorized access detection—Unauthorized manipulation on the encrypted data without the encryption key would be noticed at decryption time.

8. Maintaining DB structure—The SPDE database encryption system and method, according to a preferred embodiment of the present invention, complies with the structure preserving requirements. Since the basic element of reference is a database cell, no changes are needed to the database internal files. Moreover, since the DBMS has access to all the encryption keys during the session, values are decrypted, as required, allowing the internal algorithms and the user interface commands to remain without any change.

Implementing the SPDE Method in Commercial DBMSs

In the following subsections are disclosed the issues that have to be addressed while implementing the SPDE method and system, according to a preferred embodiment of the present invention, in a commercial DBMS, such as Oracle 9i®.

Oracle's® Object Types

Oracle® implements Objects similarly to packages. An instance of an object type can be stored in the database for later use as any other data type. The instance of an object is defined by the values of its elements with its member functions defined in the type body. Object types also have constructors implementing the instantiation of an object when first created. SQL queries performed on the object types evaluate the relation between two objects using a special member function which needs to be implemented. Once the order function is implemented, all SQL queries performed on the objects execute naturally without any need of query translation.

Implementing the SPDE Method

Using the Oracle's® object types, the encryption and decryption operations of the SPDE system and method, according to a preferred embodiment of the present invention, have been implemented. The new objects encapsulate the whole encryption process while the decryption process is transparent to the user executing regular SQL statements.

The Secure Object is defined, for example, as follows:

```
CREATE OR REPLACE TYPE SecureObject AS OBJECT (
    objectId NUMBER,
    ciphertextValue RAW(1024),
    actualSize NUMBER,
    CONSTRUCTOR FUNCTION SecureObject (plaintextValue
UserDataType)
        RETURN SELF AS RESULT,
    ORDER MEMBER FUNCTION match (sec SecureObject) RETURN
INTEGER
);
```

Where objectId is used for the decryption process, ciphertextValue is the encrypted value of the object, actualSize holds the actual size of the value before padding, that is used during the decryption process in order to discard the pad. The data type of the encrypted object that is defined in the constructor is selected according to the column type being encrypted.

The defined exemplary Secure Object is an entity gathering all inscription and decryption operations of the SPDE system and method, according to a preferred embodiment of the present invention. A user generating a query from the database, encrypted by means of the SPDE method, according to a preferred embodiment of the present invention, generates the same query as he would generate if said database would be a conventional database, which is not encrypted by means of said SPDE method.

The defined exemplary Secure Object comprises three variables—objectId, ciphertextValue and actualSize and two functions—SecureObject and match. The variable objectId is used for decryption operations. Since it is needed to know the position of an object in order to decrypt its value, and the position of said object is not revealed during obtaining the results to the user's query, then each object is assigned with a special identifier. After obtaining each object from the encrypted database, it is possible to determine said object position by means of the above special identifier. It is performed transparently to the user by means of the match function. ciphertextValue variable keeps the encoded string in the binary form. actualSize variable keeps the size of the original string before encryption. The operation of storing the original string size is performed transparently to the user by means of SecureObject function. match function is called by means of the database each time there is a need to perform a comparison between two encrypted objects. Database performs a call to the match function transparently to the user. The user performs a conventional SQL command and is not aware that the database uses match function in order to evaluate his query. match function obtains objectId of an object to be compared and obtains the position of said object by means of said object special identifier—objectId. Then match function decrypts the value which is stored in the string ciphertextValue by means of the encryption keys received from the user during the session. After the decryption of the above value, the position of said decrypted value is used in order to obtain the original string before encryption. SecureObject function is called by means of the database in order to encrypt the values inserted in said database by the user. SecureObject function stores the original size of the original value before encryption by means of the variable actualSize, accesses the database and obtains the next position at said database to where the new value will be inserted. SecureObject function encrypts the value together with the position to where said value will be inserted by means of the encryption key received from the user during the session. SecureObject function stores the encrypted string in ciphertextValue variable and the object is stored in the database.

In order to encrypt a column of one of the database tables, the column type has to be defined as "secure object type". Moreover, instead of the insert statement "insert ('1', ... )", the user will have to perform the following statement "insert (SecureObject('1'), ... )" indicating that the new inserted value is "secure object type". The Oracle's® object types are used in order to encapsulate the whole encryption process during insertion.

The constructor of the object SecureObject initiates the new object as follows:
INPUT: Plaintext Value.
OUTPUT: Object Encrypted According to the SPDE Method.
1. The new object is assigned a unique identifier by the DBMS.
2. The cell coordinates of the new object are retrieved from the database.
3. The $\mu$ function for these coordinates is computed.
4. The object's plaintext value is encrypted with $\mu$ as described in section.
5. The created object is stored in the database.

Updates are performed as with insertions, the only difference being: updates use the original cell coordinates of the updated cell during the encryption but delete operations remain without any special modification.

In order to perform a query, the predefined interface that Oracle's objects supply for comparison between two objects is used. An order function for the secure objects is defined as the relation between their decrypted values. After defining the order between two database objects all queries can be executed without any changes to the queries operating on the encrypted database.

The order function is defined as follows:
INPUT: Two Encrypted Objects.
OUTPUT: The Order Between The two Objects {'<','=','>'}.
1. The cell coordinates of both compared values are retrieved.
2. The $\mu$ function is computed for each of the compared values.
3. Both values are decrypted using their $\mu$ values found in step 2 above.
4. The order between the two objects is defined as the order between the plaintext values found in step 3 above.

Implementing Encryption

An important issue is when to perform the encryption. If an object is updated, it can be encrypted with the row-id of the row about to be updated before it is stored in the database using before update triggers. However, assuming that a new object is about to be inserted, it has no row-id since the row has not yet been inserted, and a way to retrieve the next row-id of the table, in which the object is about to be inserted, has to be found.

The difficulty in obtaining the next row-id of the table can be overcome by using a pseudo-code as follows:

```
INPUT: Table name.
OUTPUT: The next row-id of that table.
Start Autonomous Transaction
Insert into <table name> values (dummy_value,...);
nextRowId := Dbms_sql.get_last_rowid( );
rollback;
```

-continued

```
End Autonomous Transaction
Return nextRowId;
```

The above pseudo-code uses a mechanism called autonomous transaction. Declaring a code block as autonomous transaction guarantees that all DML operations performed within this block can be committed (or rollbacked) without influencing the main transaction that called for the autonomous transaction in the first place. In the above pseudo-code a dummy value is inserted into the table. Then the row-id of the inserted row can be obtained by means of Dbms_sql.get_last_rowid function, which determines the row identifier (row-id) to where the dummy value was inserted. Since it is an autonomous transaction block, the insertion can be rollbacked without affecting any other transactions (mainly the transaction about to insert an object into the table and calling for its row-id). After the execution of this procedure, the row-id of the next row (the variable nextRowId) of that table is obtained and is transferred to a function that called for the autonomous transaction. Now a way to use this function in the "before insert trigger" is need to be found. However, since a dummy value has been inserted into the same table, it will again fire the trigger. In order to overcome this problem, some special value should be used when inserting the dummy value that will inform the trigger not to call the function.

Here the use of objects again becomes useful. All objects have constructors that are used in order to instantiate them. If the above function is called from inside the object constructor, the whole encrypting process is encapsulated within the object.

Two assumptions are made when using the above code:

a. First, that there will be only one insertion in a time. If some value (let call it the second value) was physically inserted to the same table before another value (let call it the first value) was physically inserted, but after the first value called the above procedure, then there are two values encrypted with the same row-id, and one of which is wrong. In the Oracle® database, a transaction that inserts a record into a table has a lock on the table to ensure that this kind of scenario is impossible.

b. The second assumption is that the row-id of the dummy value would be the same as of the real value. However, this assumption is not always possible, since a row with 16 bytes of data can be inserted to a different row-id, for example of 64 bytes of data, depending on the database fragmentation. Thus, in order for the above second assumption to be valid, the dummy value needs to be of the same size as the real value.

Implementing Decryption

In order to retrieve the plaintext value of some cell there is a need to retrieve the cell's coordinates. The row-id of the object can not be referred, since it is not part of the table and there is no attribute which it can access in order to obtain its current row-id. If there were such an attribute, it would simplify the decryption process. However, if a unique sequence number for each object created as one of the object attributes is kept, it can be used in order to retrieve the current object.

The following pseudo-code illustrates a decryption procedure which can be implemented as a member function of the encrypted object in order to retrieve the object's row-id using its object-id:

```
INPUT: Table name, Column name.
OUTPUT: The Decrypted Value.
Select rowid into currentRowId
   from <Table name>
   Where <Column name>.getObjectId = SELF.objectId; (SELF is a
   reference to the object that is used to access the particular instance of the
   object from the scope of its member functions)
Return currentRowId;
```

It is needed to know the row-id (row identifier) of the value which has to be decrypted. The object is obtained from the table and is identified by means of the objectId variable. During the object obtaining process, the row-id (rowid variable) of the object is also obtained. At the end of the above pseudo-code the row-id of the object—currentRowId variable (which is equal to rowid variable) is transferred to a function (that called the above decryption procedure) for decryption.

Object-ids of the encrypted objects are not encrypted or secured in any way, since the only use of these values is in retrieving the corresponding row-id for a particular object. If object-ids are substituted or corrupted, it will still be possible to retrieve the correct row-id from the object-ids, since the actual value of the object-id is only used in order to find the object during decryption. One limitation regarding object-ids is that they have to be unique. This can be enforced using a unique constraint on object-ids values.

If an index on these object identifiers is built, the only overhead besides decryption is the overhead of another unique index scan for each value decrypted. However, the index has to ensure that changing the reference of the index to the database row is impossible.

In order that SQL queries perform naturally within the database without changing the database queries, the order member functions of the Oracle® database object types are used, and the relation between two objects, as the relation between their plaintext values, is declared. This enabled the use of order, group, join and select operations without the need to change the database queries. Furthermore, if a data integrity check needs to be performed (unique constraints, foreign key constraints, etc.) it would be performed after the DML operation without any special arrangements. The whole process of evaluating the order between two encrypted values for any use is concealed by the objects.

Comparing the Encrypted Values to Plaintext Values

After encrypting the database values, each database encrypted cell is represented by an object. When performing a query, this object is used in order to compare the object (encrypted cell) to other database objects (encrypted cells). Now, it is assumed that the user asks for all values equal to a given plaintext value (e.g., the number '5' or the string "abc"). If the object's order function is used, then a new encrypted object has to be created from the user's given plaintext value. However, the new object will be encrypted using the next database row-id. When the object's order function attempts to compare objects in the database with the new object in order to answer the user's query, it would try decrypting the database value using its cell coordinates. Since the encrypted value is not in a database table, there are no cell coordinates which can be used, and the row-id with which the value was encrypted can not be reconstructed, as there might have been new insertions changing the "next row-id" value from the time the query was first executed and the value encrypted. Thus, creating a new object in order to answer a user's query is not effective in this case. A cast operation is needed that would create a new secured object without encrypting the object with its cell coordinates. This new object should be marked as not encrypted, so that when the order function compares it to other objects, it will not be decrypted. Using a cast function returning an object ensures that comparing the values in the database to plaintext values is encapsulated by the object. However, if it were possible to implement user defined order function between objects and other data types in Oracle®, the use of the cast operation could be avoided.

Stable Cell Coordinates

The proposed method assumes that cell coordinates are stable. Thus, DML (data manipulation language) operations such as insert, update and delete do not modify the coordinates of existing cells. If for example, after deleting a row from a table, some cell coordinates change, then all cells encrypted using these cell coordinates will be corrupted after decryption. In the Oracle 9i® DBMS, cell coordinates are stable, thus, DML operations do not change the cell coordinates of any other cells. This property also ensures that DML operations do not impose the reconstruction of existing database indexes, since indexes use row-ids as pointers to the database indexed records.

A database reorganization process may change cell coordinates. For example, IMPORT and EXPORT operations are used in order to transfer the database content to a flat file and from there to some other (possibly the same) database. If the data is exported by a user having the encryption key, then the database content may be exported as plaintext, and its content may be encrypted during the import process with the newly allocated cell coordinates. If the data is exported by a user not possessing the encryption key, for example the DBA, data is exported exactly as retained in the database. During the export the cell coordinates are attached to each encrypted cell. When importing the data, the encryption keys are required since the value had to be decrypted. The decryption process uses the corresponding cell coordinates for each value attached to it during the export in order to obtain the plaintext value of each cell. After the plaintext values are obtained they are encrypted with the new cell coordinates in the database into which the values are imported.

Transforming a Regular Database to an Encrypted Database

In order to transform a regular database to an encrypted database using the SPDE database encryption system and method, according to a preferred embodiment of the present invention, a parallel database method with all the regular database tables are recreated where each type is used in the regular database table as a column type, a secure object of the same type is to be created and the column is declared to be of that object type. All the constraints and foreign-keys are to be copied as is. Triggers or packages comparing plaintext values to values in the database need to be changed so that a cast operation is performed on the plaintext values. Indexes on the encrypted tables need to be created, since regular indexes, if created, would expose the order of the indexed values. All queries remain the same, thus the changes do not affect the database software.

Evaluation Environment

The SPDE method and system, according to the present invention, were implemented and evaluated in Oracle® 9i DBMS environment. The standard obfuscation toolkit that comes with the Oracle® database was used in order to perform DES encryption. The SPDE method and system, according to the present invention, were implemented using the Object Type that was implemented in the Oracle® 9i database. During the evaluation a table with one column, that contained data payload of 128 bytes stored in an Oracle object type, was used.

Evaluation Goal—A goal in the following evaluations is to measure the constant that the implementation of the SPDE method and system, according to the present invention, add compared to a two testing methods and systems: method and system that apply encryption without cell coordinates and method and system without encryption.

Evaluation Parameter—The parameter that is measured in order to evaluate SPDE method and system, according to the present invention, is the CPU time, since most of the overhead of SPDE scheme is attributed to CPU time.

Evaluation Plan—In order to evaluate the encryption and decryption operations, it was chosen to evaluate two main database operations: insertion and selections. Each insertion or selection in the SPDE method and system, according to the present invention, consists of three main operations: insertion (or selection of an object), retrieval of the object cell coordinates and encryption (or decryption). The CPU time in each of these three cases is measured by building a different system for each case. The first system is the SPDE system, according to the present invention. The second system encrypts the object as in the SPDE system, according to the present invention, but without retrieving its row-ids. This system is referred as NDE system (Naive Database Encryption). The third system only stores the value as a plaintext value in an object. The third system is referred as OWE system (Object Without Encryption).

Experiment No. 1—Insertions

The CPU time of n subsequent insertions is measured using the SPDE system, according to the present invention. Also are measured n subsequent insertions using the NDE system and n subsequent insertions using the OWE system into a truncated (empty) table. The value of n was selected between 5 and 50. The overhead of the SPDE system, according to the present invention, is constant and the goal is to find this constant, added by said SPDE system implementation.

The results received from measuring the CPU time in the SPDE system, according to the present invention, are compared to the CPU time NDE and OWE systems.

It was found that in the implementation of the SPDE system, according to a preferred embodiment of the present invention, that the constant overhead is 12.62 factor between OWE (Object Without Encryption) and SPDE systems and 4.99 factor between NDE (Naive Database Encryption) and SPDE systems in case of insertions. The factor received for the SPDE system, according to a preferred embodiment of the present invention, compared to the NDE system caused by the operation of retrieving the row-ids, since rollback and insertions are CPU expensive operations. This overhead could be avoided if Oracle® supplied an efficient way to retrieve the next row-id of a value about to be inserted that could be used instead of the mechanism.

Experiment No. 2—Queries

In order to evaluate the overhead of selections using the SPDE system, according to the present invention, compared to the NDE and OWE systems, a query is performed using each of those systems on a table with n records, where n is between 5 and 50. Each of the queries performed a full table scan on the encrypted table, since no index was defined on the table. However, the constant value that was received in this experiment represents the constant overhead of the decryption operation when queries are used.

The results received from measuring the CPU time in the SPDE system, according to the present invention, are compared to the CPU time NDE and OWE systems.

It was found that in this implementation of the SPDE system, according to the present invention, the constant overhead is 15.86 factor between OWE and SPDE systems and 1.11 between NDE and SPDE systems in case of selections. The factor received between OWE and SPDE systems simply caused by the decryption process. The degradation in performance between SPDE and NDE systems is caused by the process of fetching the cell coordinates of the object. If the retrieval of cell coordinates was supported by Oracle®, the 11% overhead of fetching the cell coordinate had been avoided.

Experiment Analysis

The experiments above show that the SPDE method and system, according to the present invention, only adds a constant factor to insertions and queries. The constant factors measured during the evaluation can be further reduced if a dedicated hardware for encryption is employed or Oracle® supported efficient retrieval of cell coordinates.

Most commercial databases perform caching to values that were recently accessed. However, the values are kept in the cache the same way as they are kept in the database. For regular databases it makes no difference but when applying database encryption, better performance can be achieved if values are kept decrypted in memory and thus avoid some decryption operations.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A Structure Preserving Database Encryption system for encrypting a content stored in cells of a database, comprising:
A) a computer provided with a client having access right definition to data stored in said database, wherein said client is used for communicating with said database by generating a communication session, and for allowing a person operating said client to retrieve data from said database;
B) a computerized authentication server for identifying said client and for transferring one or more encryption keys to said client; and
C) a computerized database server for encrypting data stored in each cell of a table within said database and for communicating with said client via said generated communication session, thereby providing said client according its access right definition a decrypt data;
wherein a value stored in a corresponding cell is determined, and each of said cells within said database has a unique cell coordinates represented by table, row and column identifiers, and wherein a concatenation function is activated on said cell table, row and column identifiers and as a result, a number based on said identifiers is obtained, and wherein a XOR operation between said number and said value stored in said cell is operated or a concatenation of said number with said value stored in said cell is performed;
wherein the decrypt data is obtained by a process, comprising:
a) identifying the client by means of an authentication server communicating over a conventional identification protocol;
b) receiving one or more encryption keys from said authentication server by said client, wherein said one or more encryption keys being relevant for performing at least one query from said client, according to the access right definition of said client;
c) generating a session by means of said client with a database server;
d) transferring from said client to said database server the corresponding one or more encryption keys received from said authentication server;
e) generating at least one query by said client;
f) searching by means of said database server an encrypted database for a corresponding data requested in said at least one query;
g) after finding said corresponding data, decrypting said corresponding data by means of said one or more corresponding encryption keys; and
h) transferring the results of said at least one query from said database server to said client.

2. A method according to claim 1, further comprising allowing to define an encrypted index for each table in the database which containing the encrypted cell content.

3. A method according to claim 2, wherein the encrypted index for each table in said database, comprising the steps of:
a. concatenating a content of each cell value in said table with a random number having a fixed number of bits or the row identifier of each cell in said table; and
b. activating a nondeterministic encryption function on the result obtained from said concatenating, thereby generating one or more encrypted index entries each of which containing one or more encrypted indexed values.

4. A method according to claim 3, wherein the encrypted index for each table in said database further comprising the steps of:
a. providing an entry self pointer which used as a node identifier of a corresponding index, said self pointer determines the position of the corresponding node in said corresponding index;
b. obtaining an internal pointer to each encrypted index entry;
c. obtaining an external pointer to a corresponding row in a table wherein said cell value is stored;
d. encrypting said external pointer by a conventional encryption function; and
e. activating a message authentication code function on the indexed value of said self, internal, and external pointers, thereby calculating a message authentication code value.

5. A method according to claim 4, further comprising:
a. defining a fixed size pool for each index, said pool holding one or more values for inserting into the corresponding index; and
b. updating each of said indexes with the corresponding said one or more values, whenever said pool is full.

6. A method to claim 5, further comprising extracting corresponding values from a corresponding pool to the corresponding index in a random order.

7. A method according to claim 3, further comprising executing a client's query in the encrypted index for each table in said database, wherein said executed query is done by means of a database server using sub-indexes.

8. A method according to claim 7, wherein the executing of a client's query in the encrypted index for each table in said database, comprising the steps of:
a. connecting to a database server via said client and identifying said client;
b. creating a secure session between said database server and said client;
c. transferring one or more encryption keys by means of said client to said database server;
d. submitting a query by means of said client to said database server;

e. locating a corresponding sub-indexes which said client is entitled to access;
f. executing said query on said corresponding sub-indexes by means of said database server using said one or more encryption keys;
g. obtaining a result to said query; and
h. transferring said obtained result to said client.

9. A Structure Preserving Database Encryption method for encrypting a content of one or more cells in a database, wherein each of which of said cells having a unique cell coordinates represented by table, row and column identifiers in said database, comprising the steps of:
  A) generating a unique number for each of said cells according to the corresponding table, row and column identifiers of each of said cells; and
  B) encrypting a content of each of said cells with its corresponding generated unique number, while a structure of tables and indexes of said database remains as before the encryption which provides a transparent decryption process to a user;
wherein encryption of each cell value is performed by:
  I) determining a value stored in a corresponding cell;
  II) determining a position of said cell within the database by determining said table, row and column identifiers of each of said cells;
  III) activating a function concatenating said table, row and column identifiers of each of said cells and as a result, obtaining a number based on said identifiers;
  IV) performing a XOR operation between said number and said value stored in said cell or concatenating said number with said value stored in said cell; and
  V) activating an encryption function on a result obtained from said XOR operation or from said concatenating of said number with said value stored in said cell;
wherein a decryption process, comprising:
  a) identifying a client by means of an authentication server communicating over a conventional identification protocol;
  b) receiving one or more encryption keys from said authentication server by said client, wherein said one or more encryption keys being relevant for performing at least one query from said client, according to an access right definition of said client;
  c) generating a session by means of said client with a database server;
  d) transferring from said client to said database server the corresponding one or more encryption keys received from said authentication server;
  e) generating at least one query by said client;
  f) searching by means of said database server an encrypted database for a corresponding data requested in said at least one query;
  g) after finding said corresponding data, decrypting said corresponding data by means of said one or more corresponding encryption keys; and
  h) transferring the results of said at least one query from said database server to said client.

10. A method according to claim 9, wherein the content of each cell in the database before the encryption comprises a plaintext value, while after the encryption the content of each cell in said database comprises a ciphertext value.

11. A method according to claim 9, further comprising activating a hash function on the generated unique number, thereby obtaining a hashed unique number.

12. A method according to claim 9, further comprising activating on the encrypted cell content a decryption function which decrypts the value encrypted within said cell, by performing a XOR operation between said decrypted value and the generated unique number for said cell.

13. A method according to claim 12, further comprising activating on an encrypted cell content a decryption function which decrypts the value encrypted within said cell, by performing a XOR operation between said decrypted value and a hashed unique number, or by performing discarding said hashed unique number from said decrypted value.

* * * * *